(12) United States Patent
Goldenberg et al.

(10) Patent No.:  US 12,587,728 B2
(45) Date of Patent:  Mar. 24, 2026

(54) COMPACT DOUBLE FOLDED TELE CAMERAS INCLUDING FOUR LENSES OF +-+-, +-++ OR +--+; OR SIX LENSES OF +-+-+- OR +-+--- REFRACTIVE POWERS

(71) Applicant: Corephotonics Ltd., Tel Aviv (IL)

(72) Inventors: Ephraim Goldenberg, Tel Aviv (IL); Itay Yedid, Tel Aviv (IL); Gal Shabtay, Tel Aviv (IL); Itamar Boral, Tel Aviv (IL); Nadav Goulinski, Tel Aviv (IL); Ziv Shemesh, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 18/254,858

(22) PCT Filed: Oct. 23, 2022

(86) PCT No.: PCT/IB2022/060175
§ 371 (c)(1),
(2) Date: May 28, 2023

(87) PCT Pub. No.: WO2023/079403
PCT Pub. Date: May 11, 2023

(65) Prior Publication Data
US 2024/0302628 A1      Sep. 12, 2024

Related U.S. Application Data

(60) Provisional application No. 63/288,047, filed on Dec. 10, 2021, provisional application No. 63/274,700, filed on Nov. 2, 2021.

(51) Int. Cl.
*G02B 9/62*       (2006.01)
*G02B 13/00*      (2006.01)
(Continued)

(52) U.S. Cl.
CPC ............... *H04N 23/55* (2023.01); *G02B 9/62* (2013.01); *G02B 13/0045* (2013.01); *G02B 13/0065* (2013.01); *G02B 13/02* (2013.01)

(58) Field of Classification Search
CPC .. G02B 9/62; G02B 13/0045; G02B 13/0065; G02B 13/02
See application file for complete search history.

(56) References Cited

U.S. PATENT DOCUMENTS 2,106,752 A      2/1938  Land
2,354,503 A      7/1944  Arthur
(Continued)

FOREIGN PATENT DOCUMENTS

CN       101634738 A      1/2010
CN       102147519 A      8/2011
(Continued)

OTHER PUBLICATIONS

A compact and cost effective design for cell phone zoom lens, Chang et al., Sep. 2007, 8 pages.
(Continued)

*Primary Examiner* — Wen Huang
(74) *Attorney, Agent, or Firm* — Nathan & Associates Patent Agents Ltd.; Menachem Nathan

(57) ABSTRACT

In some embodiments there are disclosed folded camera modules comprising a lens with 6 lens elements divided into two lens groups G1 and G2 and an effective focal length EFL, an object side-optical path folding element O-OPFE, an image side-optical path folding element I-OPFE and an image sensor, wherein G1 is located at an object side of the O-OPFE and G2 is located at an image side of the O-OPFE, wherein 8 mm<EFL<50 mm, wherein a camera module is divided into a first region having a minimum camera module region height $MH_M$ and including G1 and the O-OPFE, and
(Continued)

into a second region having a minimum shoulder region height $MH_S<MH_M$ and including the I-OPFE and the image sensor, wherein an aperture height of the lens is $H_L$ and wherein $H_L/MH_S>0.9$. In some embodiments, there are disclosed folded camera modules comprising a lens with N=4 lens elements having a lens thickness $T_{Lens}$ and a total track length TTL, an I-OPFE and an O-OPFE, wherein the EFL is in the range of 8 mm<EFL<50 mm, and wherein $T_{Lens}/TTL<0.4$.

20 Claims, 13 Drawing Sheets

(51) Int. Cl.
  *G02B 13/02*       (2006.01)
  *H04N 23/55*       (2023.01)

(56)                References Cited

U.S. PATENT DOCUMENTS

| | | | |
|---|---|---|---|
| 2,378,170 A | 6/1945 | Aklin | |
| 2,441,093 A | 5/1948 | Aklin | |
| 3,388,956 A | 6/1968 | Eggert et al. | |
| 3,524,700 A | 8/1970 | Eggert et al. | |
| 3,558,218 A | 1/1971 | Grey | |
| 3,864,027 A | 2/1975 | Harada | |
| 3,942,876 A | 3/1976 | Betensky | |
| 4,134,645 A | 1/1979 | Sugiyama et al. | |
| 4,338,001 A | 7/1982 | Matsui | |
| 4,465,345 A | 8/1984 | Yazawa | |
| 4,792,822 A | 12/1988 | Akiyama et al. | |
| 5,000,551 A | 3/1991 | Shibayama | |
| 5,327,291 A | 7/1994 | Baker et al. | |
| 5,331,465 A | 7/1994 | Miyano | |
| 5,969,869 A | 10/1999 | Hirai et al. | |
| 6,014,266 A | 1/2000 | Obama et al. | |
| 6,035,136 A | 3/2000 | Hayashi et al. | |
| 6,147,702 A | 11/2000 | Smith | |
| 6,169,636 B1 | 1/2001 | Kreitzer | |
| 6,654,180 B2 | 11/2003 | Ori | |
| 7,187,504 B2 | 3/2007 | Horiuchi | |
| 7,206,136 B2 | 4/2007 | Labaziewicz et al. | |
| 7,515,351 B2 | 4/2009 | Chen et al. | |
| 7,564,635 B1 | 7/2009 | Tang | |
| 7,643,225 B1 | 1/2010 | Tsai | |
| 7,660,049 B2 | 2/2010 | Tang | |
| 7,684,128 B2 | 3/2010 | Tang | |
| 7,688,523 B2 | 3/2010 | Sano | |
| 7,692,877 B2 | 4/2010 | Tang et al. | |
| 7,697,220 B2 | 4/2010 | Iyama | |
| 7,738,186 B2 | 6/2010 | Chen et al. | |
| 7,777,972 B1 | 8/2010 | Chen et al. | |
| 7,813,057 B2 | 10/2010 | Lin | |
| 7,821,724 B2 | 10/2010 | Tang et al. | |
| 7,826,149 B2 | 11/2010 | Tang et al. | |
| 7,826,151 B2 | 11/2010 | Tsai | |
| 7,869,142 B2 | 1/2011 | Chen et al. | |
| 7,898,747 B2 | 3/2011 | Tang | |
| 7,916,401 B2 | 3/2011 | Chen et al. | |
| 7,918,398 B2 | 4/2011 | Li et al. | |
| 7,957,075 B2 | 6/2011 | Tang | |
| 7,957,076 B2 | 6/2011 | Tang | |
| 7,957,079 B2 | 6/2011 | Tang | |
| 7,961,406 B2 | 6/2011 | Tang et al. | |
| 8,000,031 B1 | 8/2011 | Tsai | |
| 8,004,777 B2 | 8/2011 | Sano et al. | |
| 8,077,400 B2 | 12/2011 | Tang | |
| 8,149,523 B2 | 4/2012 | Ozaki | |
| 8,218,253 B2 | 7/2012 | Tang | |
| 8,228,622 B2 | 7/2012 | Tang | |
| 8,233,224 B2 | 7/2012 | Chen | |
| 8,253,843 B2 | 8/2012 | Lin | |
| 8,279,537 B2 | 10/2012 | Sato | |
| 8,363,337 B2 | 1/2013 | Tang et al. | |
| 8,395,851 B2 | 3/2013 | Tang et al. | |
| 8,400,717 B2 | 3/2013 | Chen et al. | |
| 8,451,549 B2 | 5/2013 | Yamanaka et al. | |
| 8,503,107 B2 | 8/2013 | Chen et al. | |
| 8,514,502 B2 | 8/2013 | Chen | |
| 8,570,668 B2 | 10/2013 | Takakubo et al. | |
| 8,718,458 B2 | 5/2014 | Okuda | |
| 8,780,465 B2 | 7/2014 | Chae | |
| 8,810,923 B2 | 8/2014 | Shinohara | |
| 8,854,745 B1 | 10/2014 | Chen | |
| 8,958,164 B2 | 2/2015 | Kwon et al. | |
| 9,185,291 B1 | 11/2015 | Shabtay et al. | |
| 9,229,194 B2 | 1/2016 | Yoneyama et al. | |
| 9,235,036 B2 | 1/2016 | Kato et al. | |
| 9,279,957 B2 | 3/2016 | Kanda et al. | |
| 9,438,792 B2 | 9/2016 | Nakada et al. | |
| 9,488,802 B2 | 11/2016 | Chen et al. | |
| 9,568,712 B2 | 2/2017 | Dror et al. | |
| 9,678,310 B2 | 6/2017 | Iwasaki et al. | |
| 9,817,213 B2 | 11/2017 | Mercado | |
| 2002/0118471 A1 | 8/2002 | Imoto | |
| 2003/0048542 A1 | 3/2003 | Enomoto | |
| 2005/0041300 A1 | 2/2005 | Oshima et al. | |
| 2005/0062346 A1 | 3/2005 | Sasaki | |
| 2005/0128604 A1 | 6/2005 | Kuba | |
| 2005/0141103 A1 | 6/2005 | Nishina | |
| 2005/0168840 A1 | 8/2005 | Kobayashi et al. | |
| 2005/0270667 A1 | 12/2005 | Gurevich et al. | |
| 2006/0238902 A1 | 10/2006 | Nakashima et al. | |
| 2006/0275025 A1 | 12/2006 | Labaziewicz et al. | |
| 2007/0229983 A1 | 10/2007 | Saori | |
| 2007/0247726 A1 | 10/2007 | Sudoh | |
| 2007/0253689 A1 | 11/2007 | Nagai et al. | |
| 2008/0056698 A1 | 3/2008 | Lee et al. | |
| 2008/0094730 A1 | 4/2008 | Toma et al. | |
| 2008/0094738 A1 | 4/2008 | Lee | |
| 2008/0129831 A1 | 6/2008 | Cho et al. | |
| 2008/0291531 A1 | 11/2008 | Heimer | |
| 2008/0304161 A1 | 12/2008 | Souma | |
| 2009/0002839 A1 | 1/2009 | Sato | |
| 2009/0067063 A1 | 3/2009 | Asami et al. | |
| 2009/0122423 A1 | 5/2009 | Park et al. | |
| 2009/0135245 A1 | 5/2009 | Luo et al. | |
| 2009/0141365 A1 | 6/2009 | Jannard et al. | |
| 2009/0147368 A1 | 6/2009 | Oh et al. | |
| 2009/0225438 A1 | 9/2009 | Kubota | |
| 2009/0279191 A1 | 11/2009 | Yu | |
| 2009/0303620 A1 | 12/2009 | Abe et al. | |
| 2010/0033844 A1 | 2/2010 | Katano | |
| 2010/0060995 A1 | 3/2010 | Yumiki et al. | |
| 2010/0165476 A1 | 7/2010 | Eguchi | |
| 2010/0214664 A1 | 8/2010 | Chia | |
| 2010/0277813 A1 | 11/2010 | Ito | |
| 2011/0001838 A1 | 1/2011 | Lee | |
| 2011/0032409 A1 | 2/2011 | Rossi et al. | |
| 2011/0080655 A1 | 4/2011 | Mori | |
| 2011/0102667 A1 | 5/2011 | Chua et al. | |
| 2011/0102911 A1 | 5/2011 | Iwasaki | |
| 2011/0115965 A1 | 5/2011 | Engelhardt et al. | |
| 2011/0149119 A1 | 6/2011 | Matsui | |
| 2011/0157430 A1 | 6/2011 | Hosoya et al. | |
| 2011/0188121 A1 | 8/2011 | Goring et al. | |
| 2011/0249347 A1 | 10/2011 | Kubota | |
| 2012/0062783 A1 | 3/2012 | Tang et al. | |
| 2012/0069455 A1 | 3/2012 | Lin et al. | |
| 2012/0092777 A1 | 4/2012 | Tochigi et al. | |
| 2012/0105708 A1 | 5/2012 | Hagiwara | |
| 2012/0147489 A1 | 6/2012 | Matsuoka | |
| 2012/0154929 A1 | 6/2012 | Tsai et al. | |
| 2012/0194923 A1 | 8/2012 | Um | |
| 2012/0229920 A1 | 9/2012 | Otsu et al. | |
| 2012/0262806 A1 | 10/2012 | Lin et al. | |
| 2013/0002933 A1 | 1/2013 | Topliss et al. | |
| 2013/0057971 A1 | 3/2013 | Zhao et al. | |
| 2013/0088788 A1 | 4/2013 | You | |
| 2013/0208178 A1 | 8/2013 | Park | |
| 2013/0271852 A1 | 10/2013 | Schuster | |
| 2013/0279032 A1 | 10/2013 | Suigetsu et al. | |

(56) References Cited

U.S. PATENT DOCUMENTS

| | | |
|---|---|---|
| 2013/0286488 A1 | 10/2013 | Chae |
| 2014/0022436 A1 | 1/2014 | Kim et al. |
| 2014/0063616 A1 | 3/2014 | Okano et al. |
| 2014/0092487 A1 | 4/2014 | Chen et al. |
| 2014/0139719 A1 | 5/2014 | Fukaya et al. |
| 2014/0146216 A1 | 5/2014 | Okumura |
| 2014/0160581 A1 | 6/2014 | Cho et al. |
| 2014/0204480 A1 | 7/2014 | Jo et al. |
| 2014/0240853 A1 | 8/2014 | Kubota et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0022896 A1 | 1/2015 | Cho et al. |
| 2015/0029601 A1 | 1/2015 | Dror et al. |
| 2015/0116569 A1 | 4/2015 | Mercado |
| 2015/0138431 A1 | 5/2015 | Shin et al. |
| 2015/0153548 A1 | 6/2015 | Kim et al. |
| 2015/0168667 A1 | 6/2015 | Kudoh |
| 2015/0205068 A1 | 7/2015 | Sasaki |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0323757 A1 | 11/2015 | Bone |
| 2015/0373252 A1 | 12/2015 | Georgiev |
| 2015/0373263 A1 | 12/2015 | Georgiev et al. |
| 2016/0033742 A1 | 2/2016 | Huang |
| 2016/0044250 A1 | 2/2016 | Shabtay et al. |
| 2016/0062084 A1 | 3/2016 | Chen et al. |
| 2016/0062136 A1 | 3/2016 | Nomura et al. |
| 2016/0070088 A1 | 3/2016 | Koguchi |
| 2016/0085089 A1 | 3/2016 | Mercado |
| 2016/0105616 A1 | 4/2016 | Shabtay et al. |
| 2016/0187631 A1 | 6/2016 | Choi et al. |
| 2016/0202455 A1 | 7/2016 | Aschwanden et al. |
| 2016/0212333 A1 | 7/2016 | Liege et al. |
| 2016/0241756 A1 | 8/2016 | Chen |
| 2016/0291295 A1 | 10/2016 | Shabtay |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0349504 A1 | 12/2016 | Kim et al. |
| 2016/0353008 A1 | 12/2016 | Osborne |
| 2017/0023778 A1 | 1/2017 | Inoue |
| 2017/0094187 A1 | 3/2017 | Sharma et al. |
| 2017/0102522 A1 | 4/2017 | Jo |
| 2017/0115471 A1 | 4/2017 | Shinohara |
| 2017/0153422 A1 | 6/2017 | Tang et al. |
| 2017/0160511 A1 | 6/2017 | Kim et al. |
| 2017/0199360 A1 | 7/2017 | Chang |
| 2017/0276911 A1 | 9/2017 | Huang |
| 2017/0310952 A1 | 10/2017 | Adomat et al. |
| 2017/0329108 A1 | 11/2017 | Hashimoto |
| 2017/0337703 A1 | 11/2017 | Wu et al. |
| 2017/0359568 A1* | 12/2017 | Georgiev ............. H10F 39/199 |
| 2018/0024319 A1 | 1/2018 | Lai et al. |
| 2018/0059365 A1 | 3/2018 | Bone et al. |
| 2018/0059376 A1 | 3/2018 | Lin et al. |
| 2018/0081149 A1 | 3/2018 | Bae et al. |
| 2018/0120674 A1 | 5/2018 | Avivi et al. |
| 2018/0149835 A1 | 5/2018 | Park |
| 2018/0196236 A1 | 7/2018 | Ohashi et al. |
| 2018/0196238 A1 | 7/2018 | Goldenberg et al. |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0268226 A1 | 9/2018 | Shashua et al. |
| 2019/0025549 A1 | 1/2019 | Hsueh et al. |
| 2019/0025554 A1 | 1/2019 | Son |
| 2019/0075284 A1 | 3/2019 | Ono |
| 2019/0086638 A1 | 3/2019 | Lee |
| 2019/0107651 A1 | 4/2019 | Sade |
| 2019/0121216 A1 | 4/2019 | Shabtay et al. |
| 2019/0155002 A1 | 5/2019 | Shabtay et al. |
| 2019/0170965 A1 | 6/2019 | Shabtay et al. |
| 2019/0196148 A1 | 6/2019 | Yao et al. |
| 2019/0215440 A1 | 7/2019 | Rivard et al. |
| 2019/0353874 A1 | 11/2019 | Yeh et al. |
| 2020/0084358 A1 | 3/2020 | Nadamoto |
| 2020/0192069 A1 | 6/2020 | Makeev et al. |
| 2020/0221026 A1 | 7/2020 | Fridman et al. |
| 2020/0333691 A1 | 10/2020 | Shabtay et al. |
| 2020/0400926 A1 | 12/2020 | Bachar |
| 2021/0048628 A1 | 2/2021 | Shabtay et al. |
| 2021/0263276 A1 | 8/2021 | Huang et al. |
| 2021/0364746 A1 | 11/2021 | Chen |
| 2021/0396974 A1 | 12/2021 | Kuo |
| 2022/0046151 A1 | 2/2022 | Shabtay et al. |
| 2022/0066168 A1 | 3/2022 | Shi |
| 2022/0113511 A1 | 4/2022 | Chen |
| 2022/0232167 A1 | 7/2022 | Shabtay et al. |
| 2023/0080373 A1* | 3/2023 | Shim ...................... G02B 15/20 |
| | | 359/676 |
| 2024/0129609 A1* | 4/2024 | Shin ......................... G02B 9/10 |

FOREIGN PATENT DOCUMENTS

| | | |
|---|---|---|
| CN | 102193162 A | 9/2011 |
| CN | 102466865 A | 5/2012 |
| CN | 102466867 A | 5/2012 |
| CN | 102147519 B | 1/2013 |
| CN | 103576290 A | 2/2014 |
| CN | 103698876 A | 4/2014 |
| CN | 104297906 A | 1/2015 |
| CN | 104407432 A | 3/2015 |
| CN | 105467563 A | 4/2016 |
| CN | 105467563 B | 4/2016 |
| CN | 105657290 A | 6/2016 |
| CN | 106680974 A | 5/2017 |
| CN | 104570280 B | 6/2017 |
| CN | 112764200 A | 5/2021 |
| JP | S54157620 A | 12/1979 |
| JP | S59121015 A | 7/1984 |
| JP | 6165212 A | 4/1986 |
| JP | S6370211 A | 3/1988 |
| JP | 406059195 A | 3/1994 |
| JP | H07325246 A | 12/1995 |
| JP | H07333505 A | 12/1995 |
| JP | H09211326 A | 8/1997 |
| JP | H11223771 A | 8/1999 |
| JP | 3210242 B2 | 9/2001 |
| JP | 2004334185 A | 11/2004 |
| JP | 2006195139 A | 7/2006 |
| JP | 2007133096 A | 5/2007 |
| JP | 2007164065 A | 6/2007 |
| JP | 2007219199 A | 8/2007 |
| JP | 2007306282 A | 11/2007 |
| JP | 2008111876 A | 5/2008 |
| JP | 2008191423 A | 8/2008 |
| JP | 2010032936 A | 2/2010 |
| JP | 2010164841 A | 7/2010 |
| JP | 2011145315 A | 7/2011 |
| JP | 2012203234 A | 10/2012 |
| JP | 2013003317 A | 1/2013 |
| JP | 2013003754 A | 1/2013 |
| JP | 2013101213 A | 5/2013 |
| JP | 2013105049 A | 5/2013 |
| JP | 2013106289 A | 5/2013 |
| JP | 2013148823 A | 8/2013 |
| JP | 2014142542 A | 8/2014 |
| JP | 2017116679 A | 6/2017 |
| JP | 2018059969 A | 4/2018 |
| JP | 2019113878 A | 7/2019 |
| KR | 20090019525 A | 2/2009 |
| KR | 20090131805 A | 12/2009 |
| KR | 20110058094 A | 6/2011 |
| KR | 20110115391 A | 10/2011 |
| KR | 20120068177 A | 6/2012 |
| KR | 20140135909 A | 5/2013 |
| KR | 20140023552 A | 2/2014 |
| KR | 20160000759 A | 1/2016 |
| KR | 101632168 B1 | 6/2016 |
| KR | 20160115359 A | 10/2016 |
| TW | M602642 U | 10/2020 |

(56)     References Cited

FOREIGN PATENT DOCUMENTS

| WO | 2013058111 A1 | 4/2013 |
|----|---------------|--------|
| WO | 2013063097 A1 | 5/2013 |
| WO | 2018130898 A1 | 7/2018 |
| WO | 2021059097 A2 | 4/2021 |

OTHER PUBLICATIONS

Consumer Electronic Optics: How small a lens can be? The case of panomorph lenses, Thibault et al., Sep. 2014, 7 pages.
Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56.
"Cheat sheet: how to understand f-stops", Internet article, Digital Camera World, 2017.
International Search Report and Written Opinion in International Patent Application PCT/IB2022/060175, dated Feb. 24, 2023.
European Search Report in related EP patent application 24219801.8, dated Mar. 10, 2025.

* cited by examiner

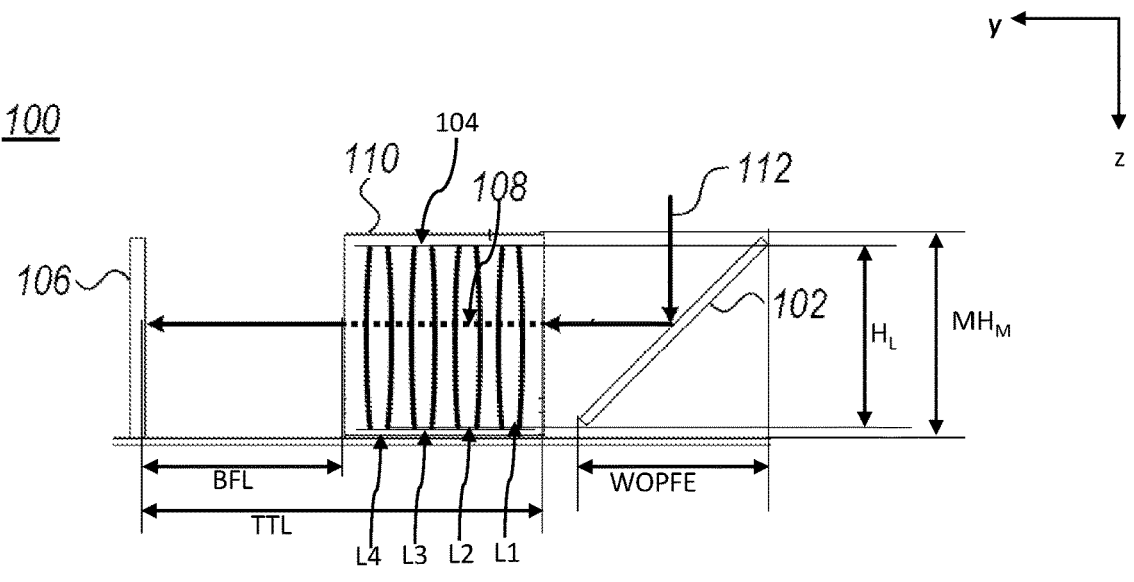
FIG. 1A    KNOWN ART
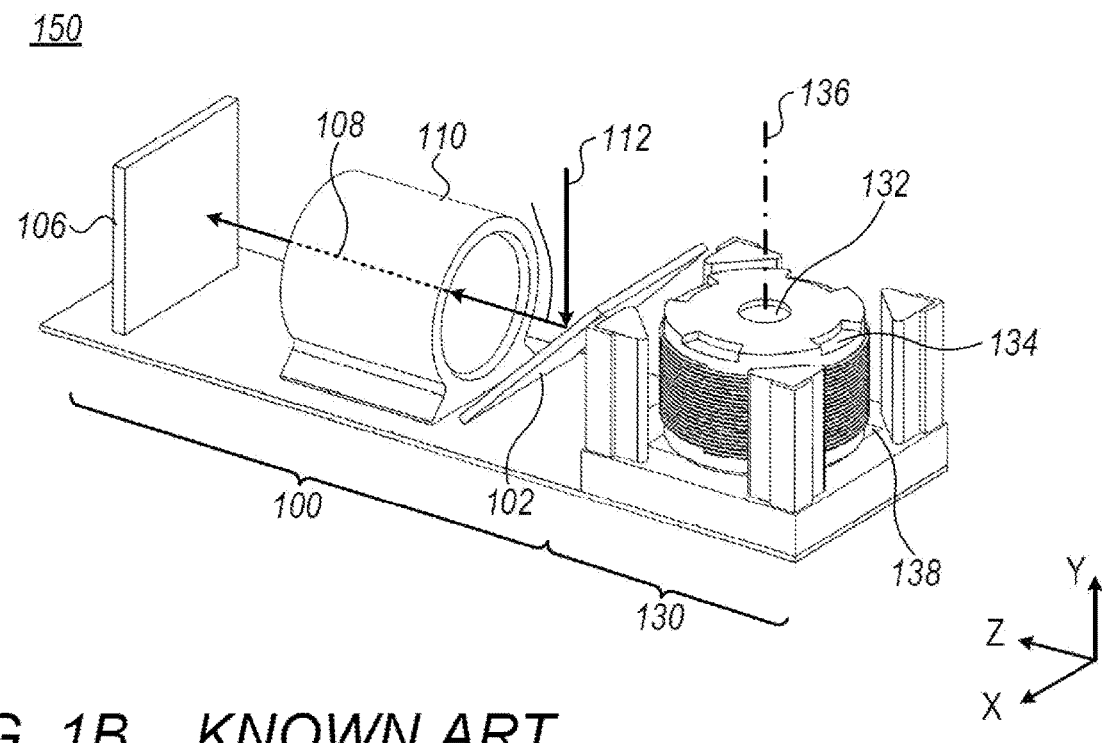
FIG. 1B    KNOWN ART

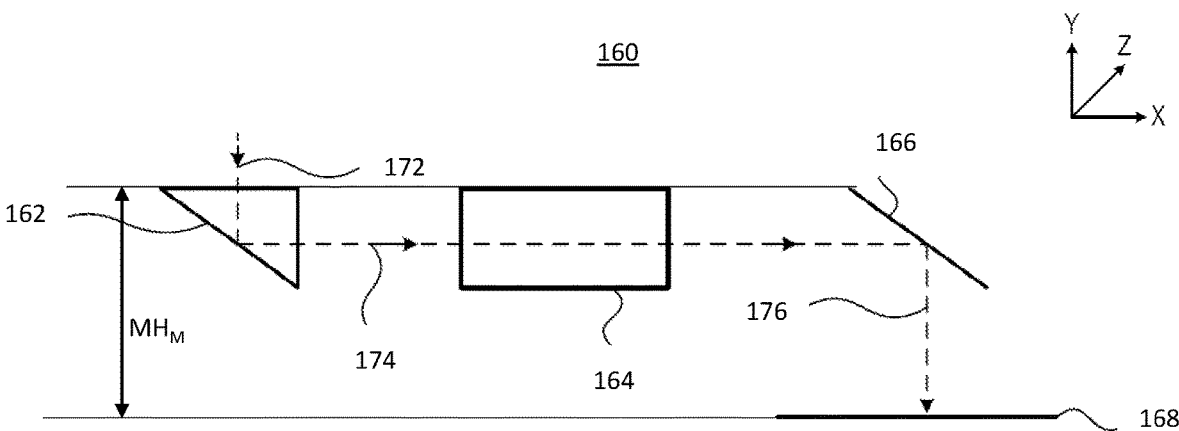
FIG. 1C   KNOWN ART
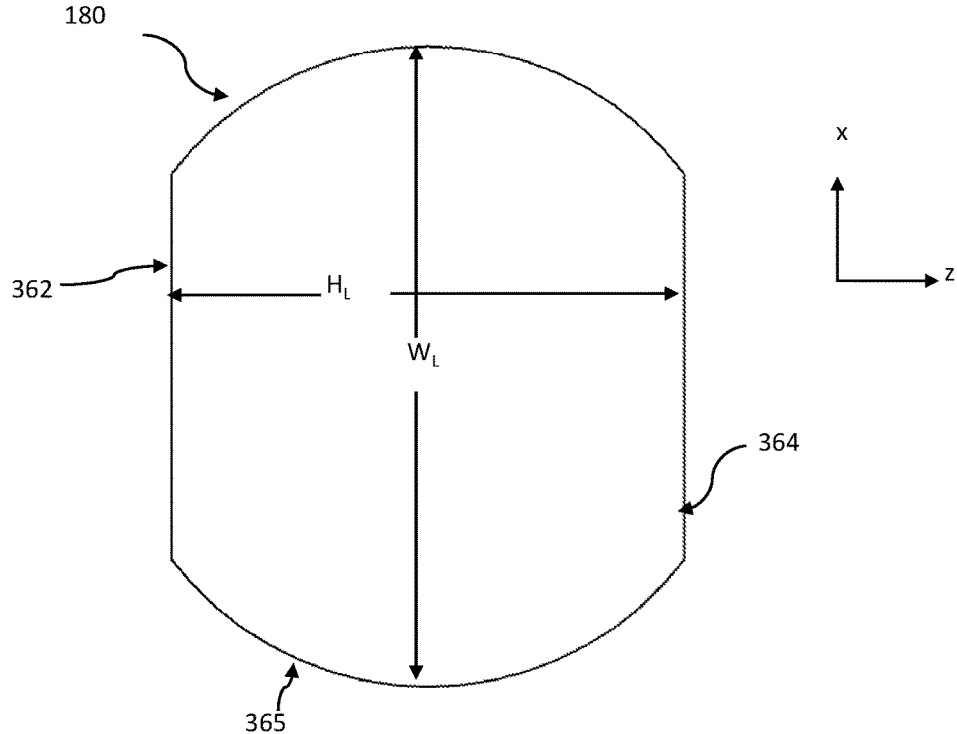
FIG. 1D   KNOWN ART

320

Y

Z

Object
side

312

302-G1

$S_2$    $H_{L1}$    $S_1$ $S_3$ $L_1$ $L_2$

317

$S_4$

316

$S_{18}$

Image
side

308

$S_{17}$ $S_5$ $S_{16}$

304

307

$MH_M$

306

$MH_S$ $S_6$

314

$L_3$    $L_4$    $L_5$    $L_6$    $S_{15}$

315

322-G2

$ML_M$

COMPACT DOUBLE FOLDED TELE CAMERAS INCLUDING FOUR LENSES OF +-+-, +-++ OR +--+; OR SIX LENSES OF +-+-+- OR +-+--- REFRACTIVE POWERS

CROSS REFERENCE TO RELATED APPLICATIONS

This is a 371 application from international patent application PCT/IB2022/060175 filed Oct. 23, 2022, which claims the benefit of priority from U.S. provisional patent applications No. 63/274,700 filed Nov. 2, 2021 and 63/288,047 filed Dec. 10, 2021, both of which are incorporated herein by reference in their entirety.

FIELD

The presently disclosed subject matter is generally related to the field of digital cameras and in particular to folded digital cameras for use in mobile electronic devices such as smartphones.

Definitions

In this application and for optical and other properties mentioned throughout the description and figures, the following symbols and abbreviations are used, all for terms known in the art:

Lens element: a single lens element.

Lens: assembly of a plurality of lens elements.

Total track length (TTL): the maximal distance, measured along an axis parallel with the optical axis of a lens, between a point of the front surface $S_1$ of a first lens element $L_1$ and an image sensor, when the system is focused to an infinity object distance.

Back focal length (BFL): the minimal distance, measured along an axis parallel with the optical axis of a lens, between a point of the rear surface $S_{2N}$ of the last lens element LN and an image sensor, when the system is focused to an infinity object distance.

Effective focal length (EFL): in a lens (assembly of lens elements $L_1$ to $L_N$), the distance between a rear principal point P' and a rear focal point F' of the lens.

f-number (f/#): the ratio of the EFL to an entrance pupil (or aperture) diameter of a lens.

BACKGROUND

Multi-aperture cameras (or "multi-cameras", of which a "dual-cameras" having two cameras is an example) are today's standard for portable electronic mobile devices ("mobile devices", e.g. smartphones, tablets, etc.). A multi-camera setup usually comprises a wide field-of-view (or "angle") $FOV_W$ camera ("Wide" camera or "W" camera), and at least one additional camera, e.g. with a narrower (than $FOV_W$) FOV (Telephoto or "Tele" camera with $FOV_T$).

FIG. 1A exemplarily illustrates a known folded Tele camera 100 comprising an optical path folding element (OPFE) 102, a lens 104 including N=4 lens elements $L_1$-$L_4$, lens 104 being included in a lens barrel 110, and an image sensor 106. Lens 104 has an optical lens height $H_L$, measured along OP 112. $H_L$ defines an aperture diameter (DA) of lens 104 along the z-direction in the YZ coordinate system shown. Lens 104 may be a cut lens, including one or more cut lens elements $L_i$ (see FIG. 1D). OPFE 102 folds an optical path (OP) from a first OP 112 (in the z direction) to a second OP 108 parallel with an optical axis of lens 104 along the y axis in the coordinate system shown. Lens 104 is located at an image side of OPFE 102. Both the TTL and the BFL of camera 100 are oriented along a dimension parallel with OP 108 (in this case, the y-axis). A theoretical limit for a height of a camera module ("minimum module height" or "$MH_M$") including camera 100 is shown. $MH_M$ is defined by the largest dimension along OP 112 of a component included in camera 100. $H_L$ is limited by $MH_M$, i.e. $H_L < MH_M$.

FIG. 1B illustrates a known dual-camera 150 that comprises folded Tele camera 100 and a (vertical or upright) Wide camera 130 that includes a Wide lens 132 and a Wide image sensor 138. Lens 132 is included in a lens barrel 134. Wide camera 130 has an OP 136 which is substantially parallel with OP 112.

FIG. 1C shows an example of a known double folded camera numbered 160 in a cross-sectional view: Camera 160 includes a first object-sided OPFE ("O-OPFE", for example a prism) 162, a lens 164 including a plurality of lens elements, a second image-sided OPFE ("I-OPFE"—for example a mirror) 166, and an image sensor 168. The optical path of camera 160 is folded twice, from a first OP 172, which is substantially parallel with the y-axis in the XYZ coordinate system shown, to a second OP 174, which is substantially parallel with the x-axis, to a third OP 176, which is substantially parallel with the y-axis. Image sensor 168 is oriented in a plane parallel with the x-z plane. O-OPFE 162 and I-OPFE 166 are oriented at an angle of 45 degrees with respect to OP 172 and OP 174.

FIG. 1D shows a known cut lens element 180 in a cross-sectional view: Lens element 180 may define an aperture of an optical lens system including lens element 180. Lens element 180 is cut by 20%, i.e. its optical width WL is 20% larger than its optical height $H_L$. This means that also the aperture of the optical lens system changes accordingly, so that the aperture is not axial symmetric. The cutting allows for a small $H_L$, which is required for small $MH_M$ (see FIG. 1A), and still relatively large effective aperture diameters (DAs) that satisfy $DA > H_L$. As defined above, $f/\# = EFL/DA$. As known, a low f/# is desired as it has 3 major advantages: good low light sensitivity, strong "natural" Bokeh effect, and high image resolution.

It is noted that herein, "aperture" refers to an entrance pupil of a lens (or "lens assembly"). If it is referred to an "aperture of a camera" or an "aperture of an optical lens system", this always refers to the aperture of the lens included in the camera or in the optical lens system respectively. "Aperture" and "clear aperture" are used interchangeably. In general, in mobile electronic devices (or just "mobile devices") such as smartphones a double folded camera such as 160 incorporates a relatively small image sensor having a SD of about 5-7 mm, and has a relatively small $H_L$ of about 4 mm-5 mm, resulting in a relatively large f/# of about 3-6 and in a relatively small ratio of $H_L/H_M$. $H_M$ is the height of a camera module including a double folded camera such as 160, $H_M$ may be about 5 mm-15 mm. $H_M$ is connected to the minimum module height ("$MH_M$", see FIG. 1A) by $H_M = MH_M +$ height penalty ("penalty"), the penalty being about 1 mm-2 mm.

It would be beneficial to have a mobile device compatible double folded Tele camera that incorporates large image sensors and provides large DAs to achieve large $H_L/MH_M$ ratios tat simultaneously allow for a low f/# and a slim camera design.

SUMMARY

In various exemplary embodiments, there are provided camera modules, comprising: a lens with N=6 lens elements $L_1$ divided into a first lens group (G1) and a second lens group (G2) and having an effective focal length EFL, an aperture diameter DA, a f-number f/#, a total track length TTL and a back focal length BFL, wherein each lens element has a respective focal length $f_i$ and wherein a first lens element $L_1$ faces an object side and a last lens element $L_N$ faces an image side; an object side-optical path folding element O-OPFE for folding a first optical path (OP1) to a second optical path (OP2); an image side-optical path folding element I-OPFE for folding OP2 to a third optical path (OP3), wherein OP1 and OP2 are perpendicular to each other and wherein OP1 and OP3 are parallel with each other; and an image sensor having a sensor diagonal (SD), wherein the camera module is a folded digital camera module, wherein G1 is located at an object side of the O-OPFE and G2 is located at an image side of the O-OPFE, wherein the EFL is in the range of 8 mm<EFL<50 mm, wherein the camera module is divided into a first region having a minimum camera module region height $MH_M$ and including G1 and the O-OPFE, and into a second region having a minimum shoulder region height $MH_S<MH_M$ and including the I-OPFE and the image sensor, wherein all heights are measured along OP1, wherein an aperture height of the lens is $H_L$ and wherein $H_L/MH_S>0.9$.

In some examples, $H_L/MH_S>1$. In some examples, $H_L/MH_S>1.05$. In some examples, $H_L/MH_S>1.1$.

In some examples, $EFL>1.1 \cdot ML_M$. In some examples, $EFL>1.2 \cdot ML_M$. In some examples, $EFL>1.3 \cdot ML_M$.

In some examples, 5 mm<SD<15 mm.

In some examples, SD/EFL>0.3. In some examples, SD/EFL>0.35. In some examples, SD/EFL>0.4.

In some examples, a ratio between an optical width of the lens WL and an optical height of the lens $H_L$ fulfills WL/HL>1.1. In some examples, WL/HL>1.2.

In some examples, EFL/TTL<1.2.

In some examples, BFL/EFL>0.25. In some examples, BFL/TTL>0.3.

In some examples, 15 mm<EFL<40 mm. In some examples, 20 mm<EFL<30 mm.

In some examples, 5 mm<DA<15 mm and 2<f/#<6.5. In some examples, 6 mm<DA<10 mm and 2.5<f/#<4.5.

In some examples, G1, the O-OPFE and G2 are movable together along OP2 relative to I-OPFE and the image sensor for focusing.

In some examples, G1, the O-OPFE, G2 and the I-OPFE are movable together along OP2 relative to the image sensor for optical image stabilization (OIS) around a first OIS axis.

In some examples, G1, the O-OPFE, and G2 are movable together along OP2 relative to the image sensor for OIS around a first OIS axis.

In some examples, G1, the O-OPFE, G2 and the I-OPFE are movable together along an axis perpendicular to both OP1 and OP2 relative to the image sensor for OIS around a second OIS axis.

In some examples, G1, the O-OPFE, and G2 are movable together along OP2 relative to the image sensor for OIS around a second OIS axis.

In some examples, the first region of the camera module has a module region height $H_M$, the second region of the camera module has a shoulder region height $H_S$, and $H_M>H_S$. In some examples, 4 mm<$H_S$<10 mm and 6 mm<$H_M$<13 mm. In some examples, 6 mm<$H_S$<8 mm and 7 mm<$H_M$<11 mm.

In some examples, $H_S/H_M$<0.9. In some examples, $H_S/H_M$<0.8.

In some examples, a ratio between an average lens thickness (ALT) of all lens elements $L_1$-$L_N$ and TTL fulfills ALT/TTL<0.05. In some examples, a ratio of the thickness of L1 (T1) and ALT fulfills T1/ALT>2.

In some examples, a distance d5-6 between $L_5$ and $L_6$ and ALT fulfills d5-6/ALT>1.2.

In some examples, L1 is made of glass.

In some examples, ratio between f1 of $L_1$ and EFL fulfills f1/EFL<0.75.

In some examples, a ratio between |f6| of $L_6$ and EFL fulfills |f6|/EFL>0.75.

In some examples, the last lens element $L_N$ is negative.

In some examples, G1 has a thickness T-G1 and T-G1/TTL<0.1.

In some examples, G2 has a thickness T-G2 and T-G2/TTL<0.1.

In some examples, G1 is a cut lens cut along an axis parallel with OP1.

In some examples, G1 is cut by 20% and MH is reduced by >10% by the cutting relative to an axial symmetric lens having a same lens diameter as the cut lens' diameter measured along an axis perpendicular to both OP1 and OP2.

In some examples, the O-OPFE and/or the I-OPFE is a mirror.

In some examples, G2 is a cut lens cut along an axis parallel with OP2.

In some examples, G2 is cut by 20% and has a cut lens diameter and MH is reduced by >10% by the cutting relative to an axial symmetric lens having a same lens diameter as the cut lens diameter measured along an axis perpendicular to both OP1 and OP2.

In some examples, the camera module does not include an I-OPFE.

In some examples, OP1 and OP3 are perpendicular to each other.

In various exemplary embodiments, there are provided mobile devices including a camera module as above, wherein the mobile device has a device thickness T and a camera bump region, wherein the bump region has an elevated height T+B, wherein a first region of the camera module is incorporated into the camera bump region and wherein a second region of the camera module is not incorporated into the camera bump region.

In some examples, the first region of the camera includes the camera module lens, and the second region of the camera includes the camera module image sensor.

In various exemplary embodiments, there are provided lenses with N=4 lens elements $L_1$ having a lens thickness $T_{Lens}$, an EFL, an aperture diameter DA, a f/#, a TTL and a BFL, wherein each lens element has a respective focal length $f_i$ and wherein a first lens element $L_1$ faces an object side and a last lens element $L_N$ faces an image side; an O-OPFE for folding a first optical path (OP1) to a second optical path (OP2); an I-OPFE for folding OP2 to a third optical path (OP3), wherein OP1 and OP2 are perpendicular to each other and wherein OP1 and OP3 are parallel with each other; and an image sensor having a sensor diagonal SD, wherein the camera module is a folded digital camera module, wherein the lens is located at an object side of the O-OPFE, wherein the EFL is in the range of 8 mm<EFL<50 mm, wherein a ratio between a lens thickness $T_{Lens}$ and the TTL, $T_{Lens}/TTL<0.4$.

In some examples, $T_{Lens}/TTL<0.3$. In some examples, $T_{Lens}/TTL<0.25$.

In some examples, a camera module is divided into a first region having a minimum camera module region height $MH_M$ and including the lens and the O-OPFE and into a second region having a minimum shoulder region height $MH_S<MH_M$ and including the I-OPFE and the image sensor, the camera module having a minimum camera module length $ML_M$, wherein all heights are measured along OP1, wherein a length is measured along OP2, wherein an aperture height of the lens is $H_L$ and wherein $H_L > MH_S - 1.5$ mm.

In some examples, $H_L > MH_S - 1$ mm.

In some examples, $H_L > 0.8 \cdot MH_S$. In some examples, $H_L > 0.9 \cdot MH_S$. In some examples, $H_L > MH_S$.

In some examples, $EFL > 1.1 \cdot ML_M$. In some examples, $EFL > 1.2 \cdot ML_M$. In some examples, $EFL > 1.3 \cdot ML_M$.

In some examples, $TTL > 1.2 \cdot ML_M$. In some examples, $TTL > 1.3 \cdot ML_M$. In some examples, $TTL > 1.4 \cdot ML_M$.

In some examples, the lens and the O-OPFE are movable together along OP2 relative to I-OPFE and the image sensor for focusing.

In some examples, the lens is movable along OP1 relative to the O-OPFE, the I-OPFE and the image sensor for focusing.

In some examples, the lens, the O-OPFE and the I-OPFE are movable together along OP2 relative to the image sensor for OIS around a first OIS axis.

In some examples, lens is movable along OP2 relative to the O-OPFE, the I-OPFE and the image sensor for OIS around a first OIS axis.

In some examples, the lens, the O-OPFE and the I-OPFE are movable together along an axis perpendicular to both OP1 and OP2 relative to the image sensor for OIS around a second OIS axis.

In some examples, the lens is movable along an axis perpendicular to both OP1 and OP2 relative to the O-OPFE, the I-OPFE and the image sensor for OIS around a second OIS axis.

In some examples, L1 is made of glass and has a refractive index n of $n > 1.7$.

In some examples, $f1 < EFL/2$.

In some examples, a sequence of the power of the lens elements $L_1$-$L_4$ is plus-minus-plus-plus. In some examples, a sequence of the power of the lens elements $L_1$-$L_4$ is plus-minus-plus-minus. In some examples, a sequence of the power of the lens elements $L_1$-$L_4$ is plus-minus-minus-plus.

BRIEF DESCRIPTION OF THE DRAWINGS

Non-limiting examples of embodiments (or "examples") disclosed herein are described below with reference to figures attached hereto that are listed following this paragraph. The drawings and descriptions are meant to illuminate and clarify embodiments disclosed herein, and should not be considered limiting in any way.

FIG. 1A illustrates a known folded Tele camera;

FIG. 1B illustrates a known dual-camera;

FIG. 1C shows schematically a known double folded Tele camera;

FIG. 1D shows a known cut lens element in a cross-sectional view;

DETAILED DESCRIPTION

In the following detailed description, numerous specific details are set forth in order to provide a thorough understanding. However, it will be understood by those skilled in the art that the presently disclosed subject matter may be practiced without these specific details. In other instances, well-known methods and features have not been described in detail so as not to obscure the presently disclosed subject matter.

Figures 2A, 2B:
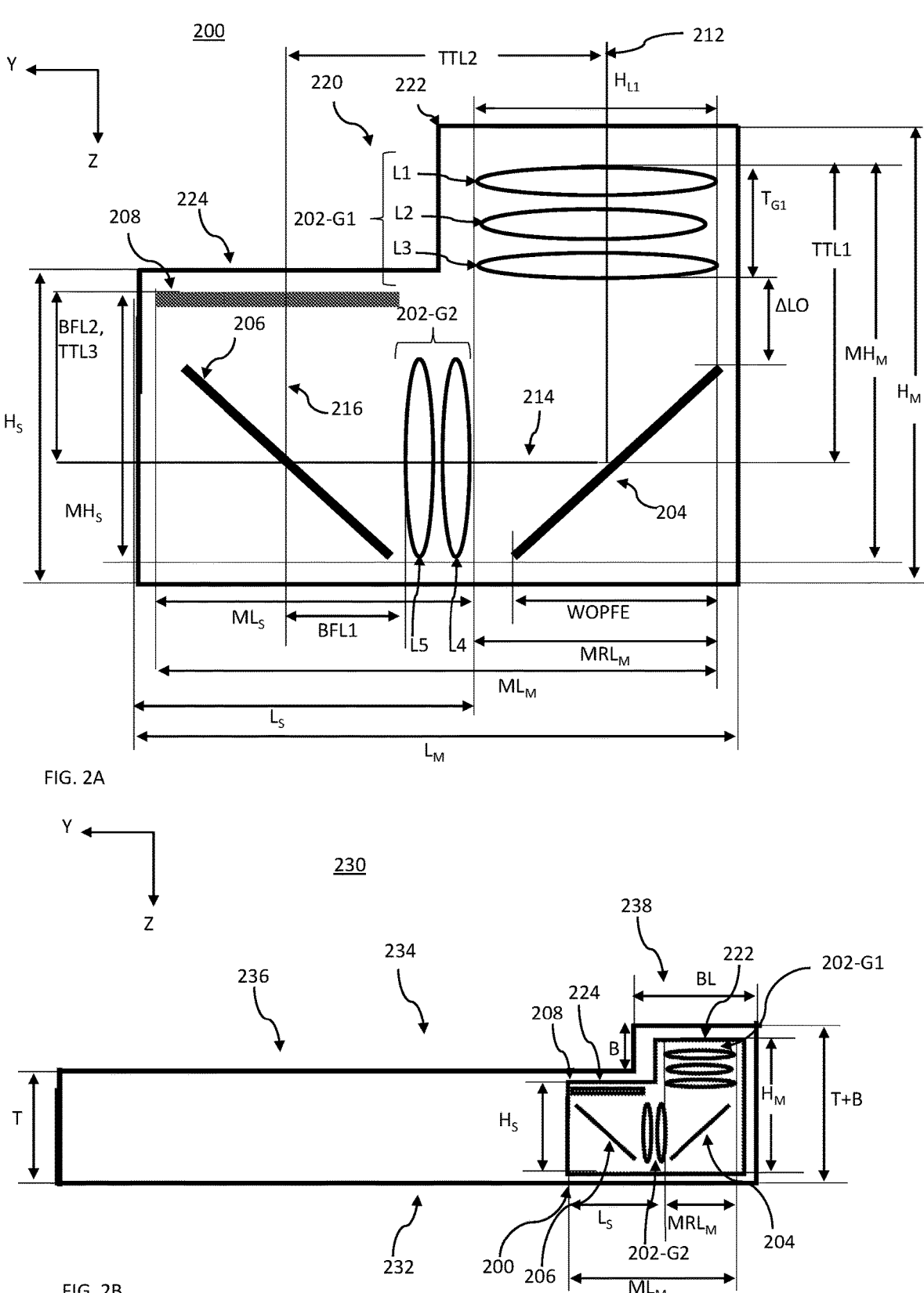
FIG. 2A shows schematically an embodiment of a double folded Tele camera module disclosed herein.
FIG. 2B shows schematically a mobile device having an exterior surface and including a double folded Tele camera as in FIG. 2A in a cross-sectional view.

FIG. 2A shows schematically an embodiment of a "2-group" (or "2G") double folded Tele camera module disclosed herein and numbered 200. Camera module 200 comprises a lens 202 with a plurality of N lens elements (here and for example N=5) numbered $L_1$-$L_N$, with $L_1$ being oriented towards an object side. Camera module 200 further comprises an O-OPFE 204 for folding a first optical path OP1 212 to a second optical path OP2 214, an I-OPFE 206 for folding OP2 to a third optical path OP3 216 and an image sensor 208. The camera elements may be included in a module housing 220, as shown. In camera 200, OP1 212 is substantially parallel with the z-axis, and OP2 214 is substantially parallel with the y-axis and OP3 216 is substantially parallel with the z-axis. O-OPFE 204 and I-OPFE 206 form an angle of 45 degrees with both the y-axis and the z-axis. Image sensor 208 is oriented in a plane perpendicular to the z-axis in the shown coordinate system.

In other examples, a camera module such as camera module 200 may not be a double folded Tele camera module, but a (single) folded Tele camera module. I.e. it may not have an OP3 and it may not include an I-OPFE such as I-OPFE 206. In these other examples. OP1 may be oriented perpendicular to OP2 (as shown) and an image sensor such as image sensor 208 may be oriented in a plane perpendicular to the y-axis in the shown coordinate system.

In yet other examples, a camera module such as camera module 200 may be a double folded Tele camera module, but OP3 may be perpendicular to OP1 (not parallel, as shown). In these yet other examples, OP1 may be parallel to the z-axis, OP2 may be parallel to the y-axis (as shown) and OP3 may be perpendicular to the shown y-z-coordinate system. An image sensor such as image sensor 208 may be oriented in a plane parallel to the shown y-z-coordinate system.

Lens 202 is divided into a first lens group ("G1") and a second lens group ("G2"), marked 202-G1 and 202-G2. G1 is located at an object side of O-OPFE 204 and G2 is located at an image side of O-OPFE 204 and at an object side of I-OPFE 206.

Camera module 200 is divided into a first, "module" region including 202-G1 and O-OPFE 204 that has a module region height $H_M$ and a minimum module region length RLM (as shown), and a second, "shoulder" region including I-OPFE 206 the image sensor 208 that has a shoulder region height $H_S < H_M$ and a shoulder region length $L_S$. All heights are measured along OP1 212, all lengths are measured along OP2 214.

The optical height and width of lens element $L_1$ may define the aperture (having a diameter DA) of camera 200, so that the optical height and the optical width of lens element $L_1$ represent also the aperture height and aperture width respectively. The height of lens element $L_1$, $H_{L1}$, is measured along the y-axis, as shown. This fact and the further design considerations disclosed herein allow the realization of optical systems that provide low f/# and large EFL (i.e. a high zoom factor), given their compact size or dimensions. This is expressed in the two following advantageous values and ratios (see Table 1):

1. An optical height, $H_L$, which is larger than 90% of the minimum shoulder height HMS, $H_L > 0.9 \cdot HMS$, or even $H_L > HM_S$;
2. An EFL which is larger by 10% (or 20%, or even 30%) than the minimum module length, $EFL > 1.1 \cdot ML_M$.

The TTL of camera module 200 is divided into three parts, TTL1-TTL3, as shown. The BFL of camera module 200 is divided into two parts, BFL1 and BFL2. A first part TTL1 is parallel with OP1 212, a second part TTL2 and a first part BFL1 are parallel with OP2 214, a third part TTL3 and a second part BFL2 are parallel with OP3 216. TTL and BFL are obtained by TTL=TTL1+TTL2+TTL3 and BFL=BFL1+BFL2 respectively.

For estimating theoretical limits for minimum dimensions of a camera module that includes optical lens systems disclosed herein, we introduce the following parameters and interdependencies. "Theoretical limits" means that only the optically operative regions of components included in the optical lens systems disclosed herein are considered.

Minimum Module Region Length $MRL_M$.

$MRL_M$ is the theoretical module region length limit of module region 222 having height $H_M$. $MRL_M$ is defined by the physical size of the components included in the module region 222.

For 200, $MRL_M = H_{G1}$, i.e. the height of G1 (measured along the y-axis) represents the lower limit for $MRL_M$.

Shoulder Region Length $L_S$

The length of shoulder region 224 having height $H_S$.

Derived from $ML_S$. For achieving a realistic estimation for a camera shoulder length ("$L_S$"), one may add for example a length of 3.5 mm to $ML_S$, i.e. $L_S = ML_S + 3.5$ mm. The additional length accounts for a movement stroke that may be required for AF and/or OIS as well as for image sensor packaging, housing, etc. Note that the value of 3.5 mm is exemplary and by no means limiting, and that the addition may vary between 1.5 mm and 10 mm.

In general, from an industrial design point of view it may be beneficial to maximize $L_S$ (minimize $ML_M$).

Minimum Module Height ("$MH_M$") and Module Height $H_M$ $MH_M$ is the theoretical module height limit of module region 222 having height $H_M$ $MH_M = H_{OPFE} + \Delta LO + T_{G1}$, $H_{OPFE}$ being the height of O-OPFE 204 in a direction parallel with OP1 112 (O-OPFE 204 is oriented at 45 degree with respect to both the y-axis and the z-axis, so that $H_{OPFE} = W_{OPFE}$) $W_{OPFE}$ being a width of the O-OPFE in a direction parallel with OP2 108, $\Delta LO$ being the distance between the center of G1 and O-OPFE 204 and $T_{G1}$ being the height (or thickness) of G1.

For achieving a realistic estimation for a camera module height, we calculate $H_M$ by adding an additional height penalty of 1.5 mm to $MH_M$, i.e. $H_M = MH_M + 1.5$ mm. The penalty accounts for movements that may be required for optical image stabilization (OIS), autofocus (AF) as well as housing, lens cover etc. Note that the value of 1.5 mm is exemplary and by no means limiting, and that the addition may vary between 0.5 mm and 3 mm.

Minimum Module Length ("$ML_M$")

$ML_M$ is the theoretical module length limit of a module housing 220 having height $H_M$.

$$ML_M = MRL_M + ML_S.$$

For achieving a realistic estimation for a camera module length ("$L_M$"), one may add for example a length of 3.5 mm to $ML_M$, i.e. $L_M = ML_M + 3.5$ mm.

Minimum Shoulder Height ("$MH_S$") and Shoulder Height $H_S$ $MH_S$ is the theoretical shoulder height limit of shoulder region 224 having height $H_S$.

For achieving a realistic estimation for shoulder height $H_S$, we calculate $H_S$ by adding an additional height of 1.5 mm to $MH_S$, i.e. $H_S = MH_S + 1.5$ mm.

In comparison to a known folded camera like camera 100, in camera module 200 image sensor 208 is not oriented parallel to the z-axis, but parallel to the y-axis (in the coordinate system shown). Given a specific $H_S$, this allows the use of larger image sensors, e.g. image sensors with sensor diagonals (SDs) in the range of about 6 mm-16 mm, as the size of the image sensor size is not limited by $H_S$. Larger image sensors are beneficial in terms of the camera's image quality, e.g. measured in terms of signal-to-noise ratio ("SNR").

FIG. 2B shows schematically a cross section of a mobile device 230 (e.g. a smartphone) having an exterior front surface 232 and an exterior rear surface 234 including 2G double folded Tele camera 200. The aperture of camera 200 is located at rear surface 234. Front surface 232 may e.g. include a screen (not visible). Mobile device 230 has a first "regular" region 236 of thickness ("T") and a second "bump" region 238 that is elevated (protrudes outwardly) by a height B over regular region 236. The bump region has a bump length ("BL") and a bump thickness T+B. Module region 222 of camera 200 is included in bump region 238. Shoulder region 224 is included in regular region 236. Optionally, in some embodiments, parts of shoulder region 224 may also be included in bump region 238.

For industrial design reasons, a small camera bump region (i.e. a short BL) is desired. A known folded camera such as 100 may be entirely included in bump region 238. In comparison, camera 200, which may be only partially included in bump region 238, allows for a smaller camera bump region (i.e. a shorter BL).

Figures 2C, 2D:
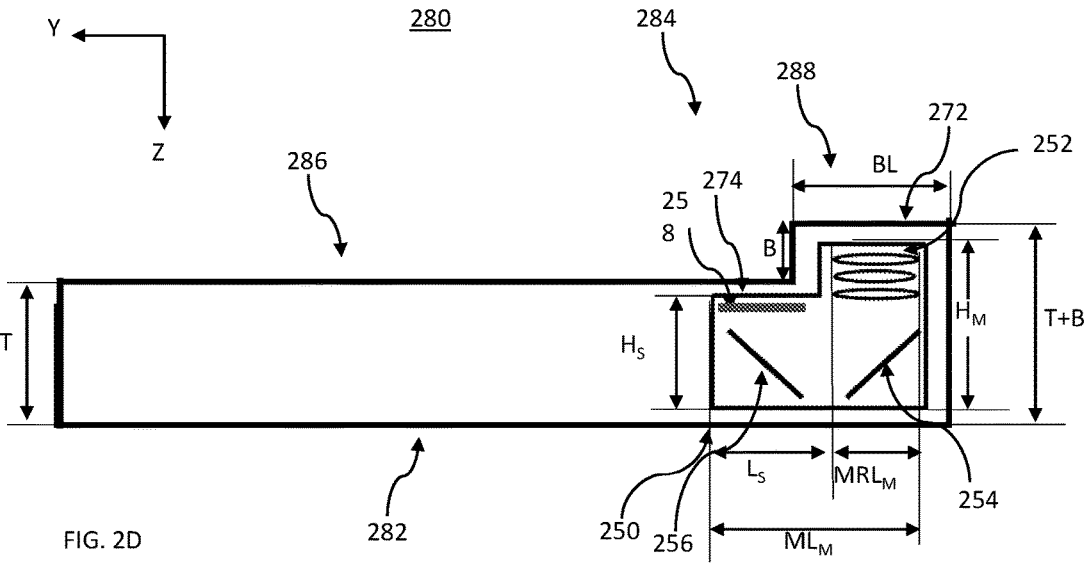
FIG. 2C shows schematically an embodiment of a 1G double folded Tele camera module disclosed herein.
FIG. 2D shows schematically a mobile device including a double folded Tele camera as in FIG. 2C in a cross-sectional view.

FIG. 2C shows schematically an embodiment of a "1-group" (or "IG") double folded Tele camera module disclosed herein and numbered 250. Camera module 250 comprises a lens 252 with a plurality of N lens elements (here and for example N=3) numbered $L_1$-$L_N$, with $L_1$ being oriented towards an object side. Camera module 250 further comprises an O-OPFE 254 for folding OP1 262 to OP2 264, an I-OPFE 256 for folding OP2 to OP3 266 and an image sensor 258. The camera elements may be included in a module housing 270. In camera 250, OP1 262 is substantially parallel with the z-axis, and OP2 264 is substantially parallel with the y-axis and OP3 266 is substantially parallel with the z-axis. O-OPFE 254 and I-OPFE 256 may or may not form an angle of 45 degrees with both the y-axis and the z-axis. Lens 252 in its entirety is located at an object side of O-OPFE 254. Image sensor 258 is oriented in a plane perpendicular to the z-axis in the shown coordinate system.

In other examples, a camera module such as camera module 250 may not be a double folded Tele camera module, but a (single) folded Tele camera module. I.e. it may not have an OP3 and it may not include an I-OPFE such as I-OPFE 256. In these other examples, OP1 may be oriented perpendicular to OP2 (as shown) and an image sensor such as image sensor 208 may be oriented in a plane perpendicular to the y-axis in the shown coordinate system.

In yet other examples, a camera module such as camera module 250 may be a double folded Tele camera module, but OP3 may be perpendicular to OP1 (not parallel, as shown). In these vet other examples, OP1 may be parallel to the z-axis, OP2 may be parallel to the y-axis (as shown) and OP3 may be perpendicular to the shown y-z-coordinate system. An image sensor such as image sensor 258 may be oriented in a plane parallel to the shown y-z-coordinate system.

The optical height and width of lens element $L_1$ may define the aperture of camera 250. The height of lens element $L_1$, $H_{L1}$, is measured along the y-axis, as shown. This fact and the further design considerations disclosed herein allow the realization of optical systems that provide low f/#, large EFL (i.e. a high zoom factor) and large TTL, given their compact size or dimensions. In addition, a lens thickness accounts for only a relatively small portion of the TTL. This is expressed in the four following advantageous values and ratios (see Table 1):

1. An optical height, $H_L$, which is larger than 80% of the minimum shoulder height $HM_S$, $H_L > 0.8 \cdot HM_S$.
2. An EFL which is larger by 10% (or 20%, or even 30%) than the minimum module length, $EFL > 1.1 \cdot ML_M$.
3. A TTL which is larger by 20% (or 30%, or even 40%) than the minimum module length, $TTL > 1.2 \cdot ML_M$.
4. A small ratio of lens thickness $T_{Lens}$ and total track length, $T_{Lens}/TTL < 0.4$ (or $<0.35$, or even $<0.3$).

Camera module 250 is divided into a module region having a module region height $H_M$ and including lens 252 and O-OPFE 254, and a shoulder region having a shoulder region height $H_S < H_M$ and including I-OPFE 256 and image sensor 258.

The TTL and the BFL of camera module 250 are divided into three parts, TTL1-TTL3 and BFL1-BFL3 respectively, as shown. TTL and BFL are obtained by TTL=TTL1+TTL2+TTL3 and BFL=BFL1+BFL2+BFL3.

FIG. 2D shows schematically a cross section of a mobile device 280 (e.g. a smartphone) having an exterior front surface 282 and an exterior rear surface 284 including double folded Tele camera 250. The aperture of camera 250 is located at rear surface 284. Front surface 282 may e.g. include a screen (not visible). Mobile device 280 has a regular region 286 of thickness ("T") and a bump region 288. The bump region has a bump length ("BL") and a bump thickness T+B. Module region 272 of camera 250 is included in bump region 288. Shoulder region 274 is included in regular region 286. Optionally, in some embodiments, parts of shoulder region 274 may also be included in bump region 288.

Camera 250, which may be only partially included in bump region 288, allows for a relatively small camera bump region (i.e. a short BL).

To clarify, all camera modules and optical lens systems disclosed herein are beneficially for use in mobile devices such as smartphones, tablets etc.

FIGS. 3A-3D and FIGS. 4-7A illustrate optical lens systems disclosed herein. All lens systems shown in FIGS. 3A-3D and FIGS. 4-7A can be included in a double folded camera module such as 200 or 250 shown in FIGS. 2A-D. In all optical lens systems disclosed in the following, the optical height and width of lens element $L_1$ defines optical lens systems' aperture.

Table 1 summarizes values and ratios thereof of various features that are included in the lens systems 300, 320, 350, 400, 500, 600 and 700 shown in FIGS. 3A-3E and FIGS. 4-7A (HL1, WL1, DA, $MH_S$, $MH_M$, $H_S$, $H_M$, ΔLO, TTL1, BFL1, TTL2, BFL2, TTL3, TTL, BFL, EFL, EFL-G1, EFL-G2, SD, ALT, d5-6, f1, f6, T1, $ML_M$, $L_M$, $MH_M$, $MH_S$, T-G1, T-G2 are given in mm, HFOV given in degrees).

"Type" specifies whether the optical lens system is a 1G or a 2G optical lens system.

N specifies the number of lens elements.

DA is the aperture diameter. For the cut lenses 352, 402 and 702, an effective aperture diameter is given. "Effective aperture diameter" means here a diameter of a circular (or axial symmetric) aperture, wherein the circular aperture has a same aperture area as the cut lens (which has a non axial-symmetric aperture).

EFL-G1 and EFL-G2 are the effective focal lengths of lens groups G1 and G2 respectively.

The average lens thickness ("ALT") measures the average thickness of all lens elements.

The average gap thickness ("AGT") measures the average thickness of all gaps between lens elements which are located on an object side of the mirror.

$d_{5-6}$ is the distance between $L_S$ and $L_6$.

$T_1$, T-G1 and T-G2 are the center thicknesses of $L_1$, G1 and G2 respectively. For 1G optical lens systems, T-G1=$T_{Lens}$, $T_{Lens}$ being the thickness of a lens.

In other examples, $H_{L1}$ may be in the range $H_{L1}$=4 mm-15 mm.

All other parameters not specifically defined here have their ordinary meaning as known in the art.

TABLE 1

| | Lens system | | | | | | |
|---|---|---|---|---|---|---|---|
| Feature | 300 | 320 | 350 | 400 | 500 | 600 | 700 |
| Type | 2G | 2G | 2G | 2G | 1G | 1G | 1G |
| N | 6 | 6 | 6 | 6 | 4 | 4 | 4 |
| $H_{L1}$ | 7.00 | 7.00 | 6.50 | 7.00 | 4.80 | 5.80 | 5.60 |
| $W_{L1}$ | 7.00 | 7.00 | 8.00 | 8.00 | 6.00 | 5.80 | 7.00 |
| DA | 7.00 | 7.00 | 7.21 | 7.79 | 5.68 | 5.80 | 6.62 |
| TTL1 | 5.96 | 5.96 | 5.96 | 6.40 | 6.30 | 6.95 | 6.71 |
| BFL1 | 4.06 | 4.06 | 4.06 | 4.10 | 2.29 | 2.56 | 2.40 |
| TTL2 | 9.29 | 9.29 | 9.29 | 10.78 | 7.50 | 7.01 | 8.28 |
| BFL2 | 3.63 | 3.63 | 3.63 | 3.90 | 7.50 | 7.01 | 8.28 |
| TTL3 | 3.63 | 3.63 | 3.63 | 3.90 | 2.76 | 4.41 | 6.04 |
| BFL3 | — | — | — | — | 2.76 | 4.41 | 6.04 |
| TTL | 18.88 | 18.88 | 18.88 | 21.08 | 16.56 | 18.37 | 21.03 |
| BFL | 7.69 | 7.69 | 7.69 | 8.01 | 12.55 | 13.98 | 16.73 |
| EFL | 21.48 | 21.48 | 21.48 | 21.48 | 16.63 | 18.01 | 19.61 |
| EFL-G1 | 16.98 | 16.98 | 16.98 | 20.49 | — | — | — |
| EFL-G2 | −23.60 | −23.60 | −23.60 | −44.10 | — | — | — |
| f number | 3.07 | 3.07 | 2.98 | 2.76 | 2.93 | 3.10 | 2.96 |
| HFOV | 12.68 | 12.68 | 12.68 | 13.90 | 10.20 | 17.50 | 10.25 |
| SD | 9.30 | 9.30 | 9.30 | 10.50 | 6.00 | 9.30 | 7.14 |
| T1 | 2.16 | 2.16 | 2.16 | 2.00 | 1.85 | 1.04 | 1.93 |
| ALT | 0.63 | 0.63 | 0.63 | 0.88 | 0.81 | 0.73 | 0.81 |
| $d_{5-6}$ | 0.89 | 0.89 | 0.89 | 0.56 | — | — | — |
| $f_1$ | 12.31 | 12.31 | 12.31 | 13.02 | 6.47 | 5.94 | 7.63 |
| $f_6$ | −10.39 | −10.39 | −10.39 | −12.28 | — | — | — |
| T-G1 | 2.63 | 2.63 | 2.63 | 3.13 | 4.01 | 4.40 | 4.30 |
| T-G2 | 2.32 | 2.32 | 2.32 | 2.95 | — | — | — |
| $ML_M$ | 16.25 | 16.25 | 16.25 | 17.80 | 12.60 | 13.28 | 13.53 |
| $L_M$ | 19.75 | 19.75 | 19.75 | 21.30 | 16.10 | 16.78 | 17.03 |
| $MH_M$ | 8.96 | 8.25 | 8.25 | 9.74 | 8.15 | 9.10 | 8.70 |
| $MH_S$ | 6.63 | 5.92 | 5.92 | 7.24 | 4.61 | 7.05 | — |
| $H_M$ | 10.46 | 9.75 | 9.75 | 11.24 | 9.65 | 10.60 | 10.20 |
| $H_S$ | 8.13 | 7.42 | 7.42 | 8.74 | 6.11 | 8.55 | — |
| $DA/H_S$ | 0.86 | 0.94 | 0.97 | 0.89 | 0.93 | 0.68 | — |
| $DA/H_M$ | 0.67 | 0.72 | 0.74 | 0.69 | 0.59 | 0.55 | 0.65 |
| $W_{L1}/H_{L1}$ | 1.00 | 1.00 | 1.23 | 1.14 | 1.25 | 1.00 | 1.25 |
| $H_{L1}/MH_S$ | 1.06 | 1.18 | 1.10 | 0.97 | 1.04 | 0.82 | |
| $H_{L1}/MH_M$ | 0.78 | 0.85 | 0.79 | 0.72 | 0.59 | 0.64 | 0.64 |
| $H_S/H_M$ | 0.78 | 0.76 | 0.76 | 0.78 | 0.63 | 0.81 | — |
| SD/EFL | 0.43 | 0.43 | 0.43 | 0.49 | 0.36 | 0.52 | 0.36 |
| $T_1/ALT$ | 3.44 | 3.44 | 3.44 | 2.28 | 2.28 | 1.44 | 2.37 |
| ALT/TTL | 0.03 | 0.03 | 0.03 | 0.04 | 0.05 | 0.04 | 0.04 |
| $d_{5-6}/ALT$ | 1.42 | 1.42 | 1.42 | 0.64 | — | — | — |
| $f_1/EFL$ | 0.573 | 0.573 | 0.573 | 0.606 | 0.389 | 0.330 | 0.389 |
| $f_6/EFL$ | −0.484 | −0.484 | −0.484 | −0.572 | — | — | — |
| EFL/TTL | 1.14 | 1.14 | 1.14 | 1.02 | 1.00 | 0.98 | 0.93 |
| BFL/EFL | 0.36 | 0.36 | 0.36 | 0.37 | 0.75 | 0.78 | 0.85 |
| BFL/TTL | 0.41 | 0.41 | 0.41 | 0.38 | 0.76 | 0.76 | 0.80 |
| T-G1/TTL | 0.14 | 0.14 | 0.14 | 0.15 | 0.24 | 0.24 | 0.20 |
| T-G2/TTL | 0.12 | 0.12 | 0.12 | 0.14 | — | — | — |
| $TTL/ML_M$ | 1.16 | 1.16 | 1.16 | 1.18 | 1.31 | 1.38 | 1.55 |
| $TTL/L_M$ | 0.96 | 0.96 | 0.96 | 0.99 | 1.03 | 1.09 | 1.23 |
| $EFL/ML_M$ | 1.32 | 1.32 | 1.32 | 1.21 | 1.32 | 1.36 | 1.45 |
| $EFL/L_M$ | 1.09 | 1.09 | 1.09 | 1.01 | 1.03 | 1.07 | 1.15 |

Figure 3A:
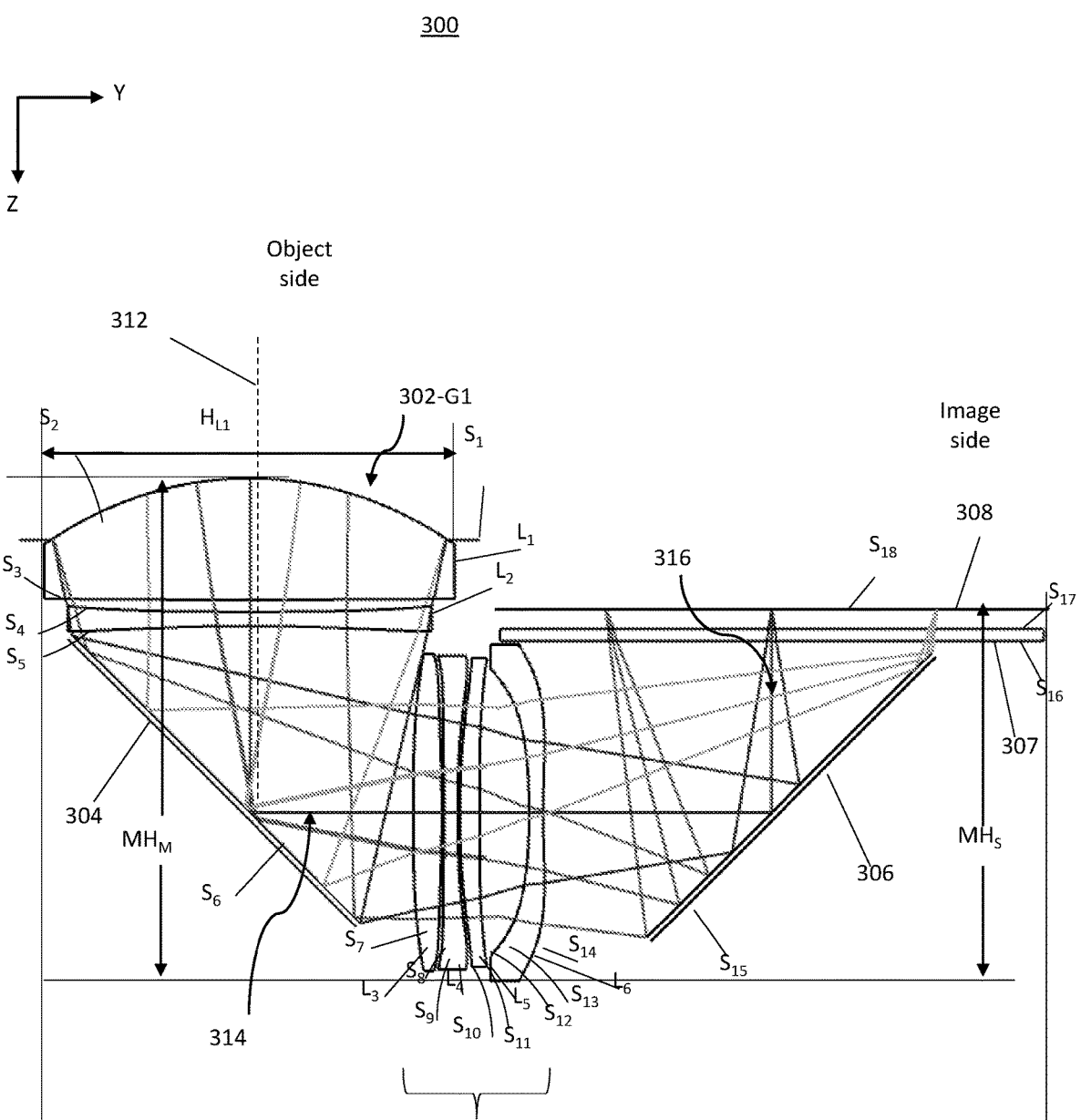
FIG. 3A shows an embodiment of an optical lens system disclosed herein in a cross-sectional view.

FIG. 3A shows an embodiment of an optical lens system disclosed herein and numbered 300. Lens system 300 comprises a lens 302, an O-OPFE 304 (e.g. a prism or a mirror), an I-OPFE 306 (e.g. a prism or a mirror), an optical element 307 and an image sensor 308. System 300 is shown with ray tracing. As for all following optical lens systems, optical element 307 is optional and may be for example an infra-red (IR) filter, and/or a glass image sensor dust cover. O-OPFE 304 and I-OPFE 306 are both oriented at an angle of 45 degrees with respect to the y-axis and the z-axis. As for all following optical lens systems, $MH_M$ and $MH_S$ of a camera module such as module 200 that may include optical system 300 are shown.

Lens 302 includes a plurality of N lens elements $L_i$ (wherein "i" is an integer between 1 and N). Here and for example, N=6. Lens 302 is divided in two lens groups, 302-G1 that includes $L_1$-$L_2$, and 302-G2 that includes $L_3$-$L_6$.

As for all following optical lens systems, the lens elements within each lens group do not move with respect to each other.

$L_1$ is the lens element closest to the object side and $L_N$ is the lens element closest to the image side, i.e. the side where the image sensor is located. This order holds for all lenses and lens elements disclosed herein. 302-G1 has an optical (lens) axis 312 and 302-G2 has an optical axis 314. Lens elements $L_1$-$L_2$ included in 302-G1 are axial-symmetric along OP1 312. Lens elements $L_3$-$L_6$ included in 302-G2 are axial-symmetric along OP2 314. Each lens element $L_1$ comprises a respective front surface $S_{2i-1}$ (the index "2i-1" being the number of the front surface) and a respective rear surface $S_{2i}$ (the index "2i" being the number of the rear surface), where "i" is an integer between 1 and N. This numbering convention is used throughout the description. Alternatively, as done throughout this description, lens surfaces are marked as "$S_k$", with k running from 1 to 2N. The front surface and the rear surface can be in some cases aspherical. This is however not limiting.

As used herein the term "front surface" of each lens element refers to the surface of a lens element located closer to the entrance of the camera (camera object side) and the term "rear surface" refers to the surface of a lens element parameter, $r_{norm}$ is generally one half of the surface's clear aperture, and $A_n$ are the polynomial coefficients shown in lens data tables. The Z axis is positive towards the image. Values for aperture radius are given as a clear aperture (or simply "aperture") radius, i.e. DA/2. The reference wavelength is 555.0 nm. Units are in mm except for refraction index ("Index") and Abbe #.

TABLE 2

Example 300
EFL = 21.48 mm, F number = 3.07, HFOV = 12.68 degree

| Surface # | Comment | Type | Curvature Radius | Thickness | Aperture Radius (DA/2) | Material | Index | Abbe # | Focal Length |
|---|---|---|---|---|---|---|---|---|---|
| 1 | A.S. | Plano | Infinity | −1.091 | 3.500 | | | | |
| 2 | Lens 1 | ASP | 6.074 | 2.161 | 3.500 | Glass | 1.48 | 84.1 | 12.313 |
| 3 | | | −345.400 | 0.214 | 3.297 | | | | |
| 4 | Lens 2 | ASP | −104.808 | 0.252 | 3.239 | Plastic | 1.66 | 20.4 | −38.393 |
| 5 | | | 33.888 | 3.333 | 3.174 | | | | |
| 6 | Mirror1 | Plano | Infinity | 2.920 | 4.773 | | | | |
| 7 | Lens 3 | ASP | 380.938 | 0.502 | 2.829 | Plastic | 1.67 | 19.2 | 34.807 |
| 8 | | | −25.103 | 0.037 | 2.819 | | | | |
| 9 | Lens 4 | ASP | −87.009 | 0.252 | 2.800 | Plastic | 1.53 | 55.7 | −55.966 |
| 10 | | | 45.901 | 0.037 | 2.774 | | | | |
| 11 | Lens 5 | ASP | 19.291 | 0.346 | 2.759 | Plastic | 1.67 | 19.2 | 26.826 |
| 12 | | | −307.348 | 0.893 | 2.729 | | | | |
| 13 | Lens 6 | ASP | −11.258 | 0.251 | 2.550 | Plastic | 1.64 | 23.5 | −10.390 |
| 14 | | | 16.642 | 4.058 | 3.007 | | | | |
| 15 | Mirror2 | Plano | Infinity | 3.063 | 5.307 | | | | |
| 16 | Filter | Plano | Infinity | 0.210 | | Glass | 1.52 | 64.2 | |
| 17 | | | Infinity | 0.350 | | | | | |
| 18 | Image | Plano | Infinity | — | | | | | | located closer to the image sensor (camera image side). Detailed optical data and surface data are given in Tables 2-3 for the example of the lens elements in FIG. 3A. The values provided for these examples are purely illustrative and according to other examples, other values can be used.

Surface types are defined in Table 2. The coefficients for the surfaces are defined in Table 3. The surface types are:

a) Plano: flat surfaces, no curvature b) Q type 1 (QT1) surface sag formula:

$$z(r) = \frac{cr^2}{1 + \sqrt{1 - (1+k)c^2 r^2}} + D_{con}(u) \quad \text{(Eq. 1)}$$

$$D_{con}(u) = u^4 \sum_{n=0}^{N} A_n Q_n^{con}(u^2)$$

$$u = \frac{r}{r_{norm}}, x = u^2$$

$$Q_0^{con}(x) = 1 \quad Q_1^{con} = -(5 - 6x) \quad Q_2^{con} = 15 - 14x(3 - 2x)$$

$$Q_3^{con} = -\{35 - 12x[14 - x(21 - 10x)]\}$$

$$Q_4^{con} = 70 - 3x\{168 - 5x[84 - 11x(8 - 3x)]\}$$

$$Q_5^{con} = -[126 - x(1260 - 11x\{420 - x[720 - 13x(45 - 14x)]\})]$$

c) Even Asphere (ASP) surface sag formula:

$$z(r) = \frac{cr^2}{1 + \sqrt{1 - (1+k)c^2 r^2}} + \alpha_1 r^2 + \alpha_2 r^4 + \alpha_3 r^6 + \alpha_4 r^8 + \quad \text{(Eq. 2)}$$

$$\alpha_5 r^{10} + \alpha_6 r^{12} + \alpha_7 r^{14} + \alpha_8 r^{16}$$

where {z, r} are the standard cylindrical polar coordinates, c is the paraxial curvature of the surface, k is the conic Each lens element $L_i$ has a respective focal length $f_i$, given in Table 2. The FOV is given as half FOV (HFOV). The definitions for surface types, Z axis, DA values, reference wavelength, units, focal length and HFOV are valid for Tables 1-13.

In some examples, O-OPFE 304 is a mirror and O-OPFE 304's dimensions are 3.1×3.63 mm (x, y, in a top view on O-OPFE), and it is tilted by 45 deg. Afterward it is Y-decentered by 0.845 mm toward $L_2$, so that the center of the O-OPFE is not located at the center of the lens.

In some examples, I-OPFE 306 is a mirror and I-OPFE 306's dimensions are 3.9×3.6 mm (x, y, in a top view on I-OPFE), and it is tilted by 45 deg. Afterward it is Y-decentered by 0.451 mm toward optical element 307.

TABLE 3

| Surface # | Aspheric Coefficients | | | |
|---|---|---|---|---|
| | Conic | 4th | 6th | 8th |
| 2 | 0 | −1.63E−04 | −6.13E−06 | −1.35E−09 |
| 3 | 0 | −4.10E−05 | 1.08E−07 | 1.76E−07 |
| 4 | 0 | −3.81E−04 | −1.20E−05 | 4.72E−07 |
| 5 | 0 | −3.75E−04 | −2.30E−05 | 6.79E−07 |
| 7 | 0 | 5.077E−03 | −4.218E−04 | 1.408E−05 |
| 8 | 0 | 2.363E−03 | 4.735E−06 | −3.195E−05 |
| 9 | 0 | 8.657E−04 | 8.101E−05 | −4.066E−05 |
| 10 | 0 | 7.057E−03 | −6.175E−04 | −2.072E−05 |
| 11 | 0 | 3.076E−03 | −3.813E−04 | 3.353E−08 |
| 12 | 0 | 5.261E−03 | −6.250E−04 | 3.571E−05 |
| 13 | 0 | −5.807E−03 | −6.225E−04 | 9.004E−06 |
| 14 | 0 | −1.016E−02 | 4.087E−05 | 1.137E−05 |

Figure 3B:
FIG. 3B shows another embodiment of an optical lens system disclosed herein in a cross-sectional view.

FIG. 3B shows another 2G optical lens system disclosed herein and numbered 320. Lens system 320 is identical to optical lens system 300, except that the second lens group 322-G2 is a cut lens obtained by cutting lens group 302-G2 as known in the art. The cutting is performed only at a bottom side 315 of 322-G2, while a top side 317 of 322-G2 is not cut. As shown in FIG. 3B, the cutting allows smaller HMM and $MH_S$ (see Table 1). Both HMM and $MH_S$ are reduced by the cutting by about 10%.

Figure 3C:
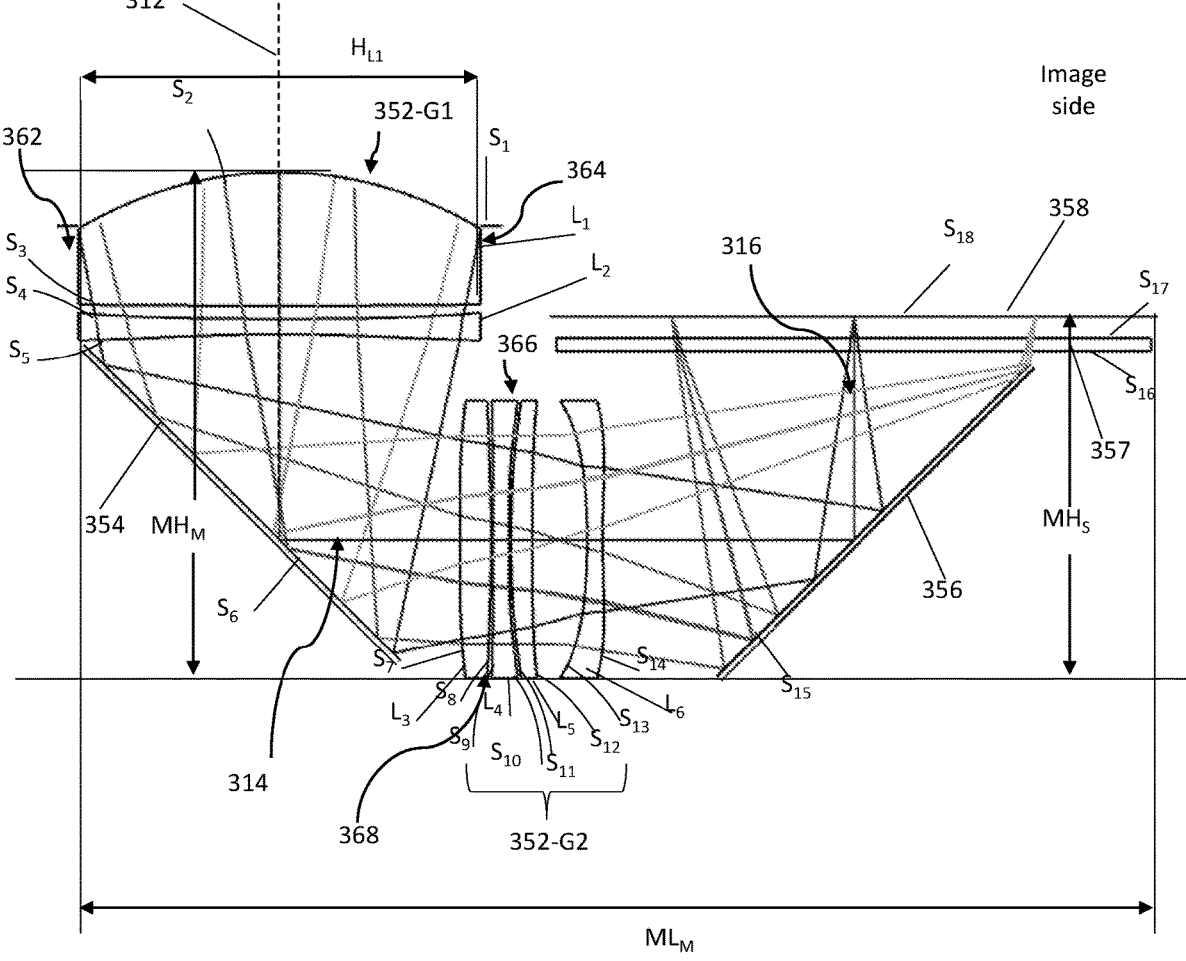
FIG. 3C shows yet another embodiment of an optical lens system disclosed herein in a cross-sectional view.

FIG. 3C shows yet another 2G optical lens system disclosed herein and numbered 350. Lens system 350 comprises a lens 352, an O-OPFE 354, an I-OPFE 356, an optical element 357 and an image sensor 358. Lens 352 is divided in two lens groups, 352-G1 that includes $L_1$-$L_2$ ("G1"), and 352-G2 that includes $L_3$-$L_6$ ("G2").

O-OPFE 354 and I-OPFE 356 are both oriented at an angle of 45 degrees with respect to the y-axis and the z-axis.

The reduction in $MH_M$ (with respect to optical lens systems 300 and 320) is caused by the fact that because the extreme fields entering optical system 350 along a y-direction are reduced, so that the width of O-OPFE 354 can be reduced.

Cutting a first lens group such as 302-G1 by X % will reduce $MH_M$ and $MH_S$ by about 0.5·X %-X %. For example, cutting a first lens group 20% will reduce $MH_M$ and $MH_S$ by about 10%-20%.

Except for the lens apertures (DA/2, see Table 1), lens elements $L_1$-$L_6$ included in optical lens system 350 have surface types and surface coefficients like lens elements $L_1$-$L_6$ included in optical lens system 300, but in optical lens system 350 lens 352 is cut by 20%, 352-G1 and 352-G2 are cut along the z-axis and along the y-axis respectively. 352-G1 is cut at both sides 362 and 364. 352-G2 is also cut at both sides 366 and 368. Surface types of optical lens system 350 are defined in Table 4. The surface types are given for the non-cut lens, aperture radii (DA/2) of the lens elements included in the cut lens 352 are given by:

1. In non-cut direction ($L_{Li}$) see values in Table 4.

2. In cut direction ($L_{Wi}$); 80% of the value see Table 4 of the largest lens element of 352-G1 ($L_1$) for lens elements included in 352-G1 and 352-G2 ($L_6$) respectively.

TABLE 4

Example 350

EFL = 21.48 mm, F number = 2.98, HFOV = 12.68 degree

| Surface # | Comment | Type | Curvature Radius | Thickness | Aperture Radius (DA/2) | Material | Index | Abbe # | Focal Length |
|---|---|---|---|---|---|---|---|---|---|
| 1 | A.S. | Plano | Infinity | −1.386 | 4.000 | | | | |
| 2 | Lens 1 | ASP | 6.074 | 2.161 | 4.000 | Glass | 1.48 | 84.1 | 12.313 |
| 3 | | | −345.400 | 0.214 | 3.827 | | | | |
| 4 | Lens 2 | ASP | −104.808 | 0.252 | 3.801 | Plastic | 1.66 | 20.4 | −38.393 |
| 5 | | | 33.888 | 3.333 | 3.720 | | | | |
| 6 | Mirror1 | Plano | Infinity | 2.920 | 4.773 | | | | |
| 7 | Lens 3 | ASP | 380.938 | 0.502 | 2.592 | Plastic | 1.67 | 19.2 | 34.807 |
| 8 | | | −25.103 | 0.037 | 2.591 | | | | |
| 9 | Lens 4 | ASP | −87.009 | 0.252 | 2.584 | Plastic | 1.53 | 55.7 | −55.966 |
| 10 | | | 45.901 | 0.037 | 2.580 | | | | |
| 11 | Lens 5 | ASP | 19.291 | 0.346 | 2.579 | Plastic | 1.67 | 19.2 | 26.826 |
| 12 | | | −307.348 | 0.893 | 2.569 | | | | |
| 13 | Lens 6 | ASP | −11.258 | 0.251 | 2.572 | Plastic | 1.64 | 23.5 | −10.390 |
| 14 | | | 16.642 | 4.058 | 2.811 | | | | |
| 15 | Mirror2 | Plano | Infinity | 3.063 | 5.307 | | | | |
| 16 | Filter | Plano | Infinity | 0.210 | — | Glass | 1.52 | 64.2 | |
| 17 | | | Infinity | 0.350 | — | | | | |
| 18 | Image | Plano | Infinity | — | — | | | | |

Figure 3D:
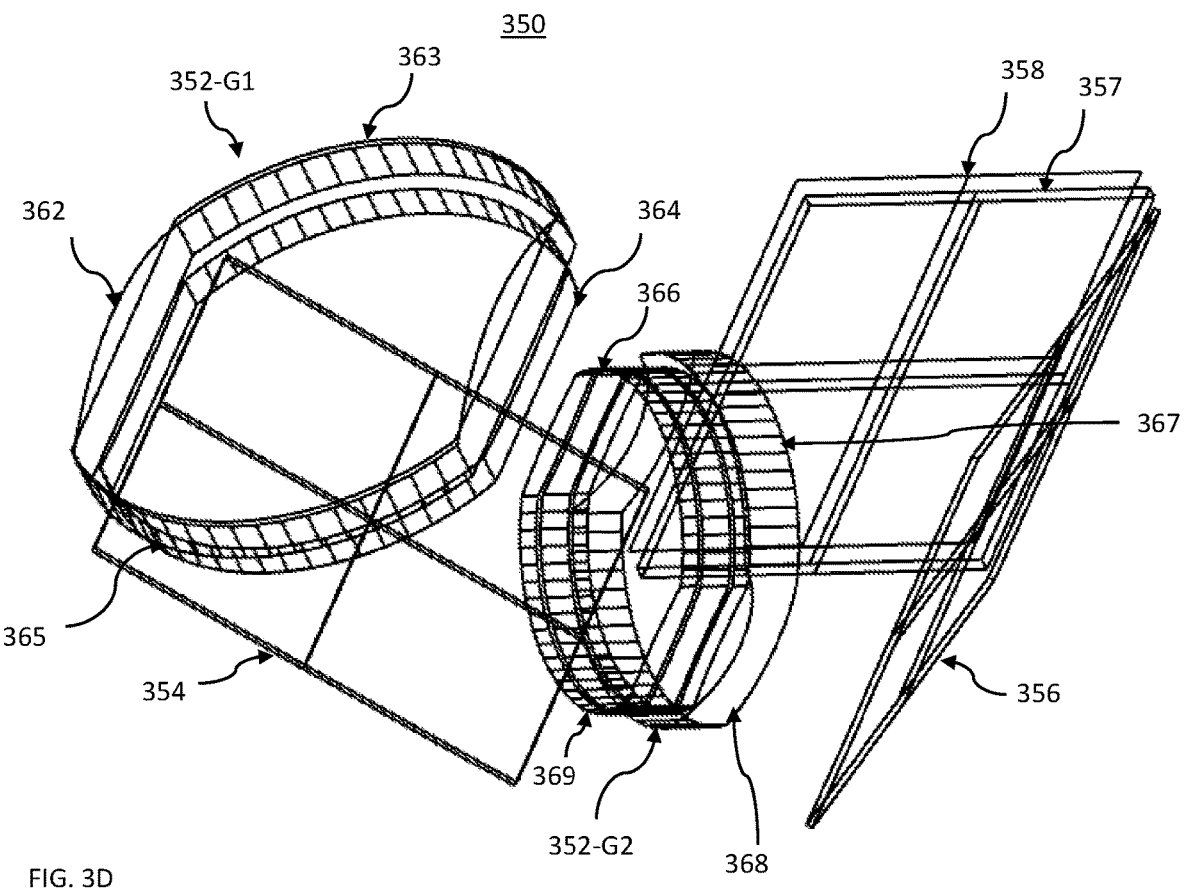
FIG. 3D shows the embodiment of an optical lens system from FIG. 3C in a perspective view.
Figure 3E:
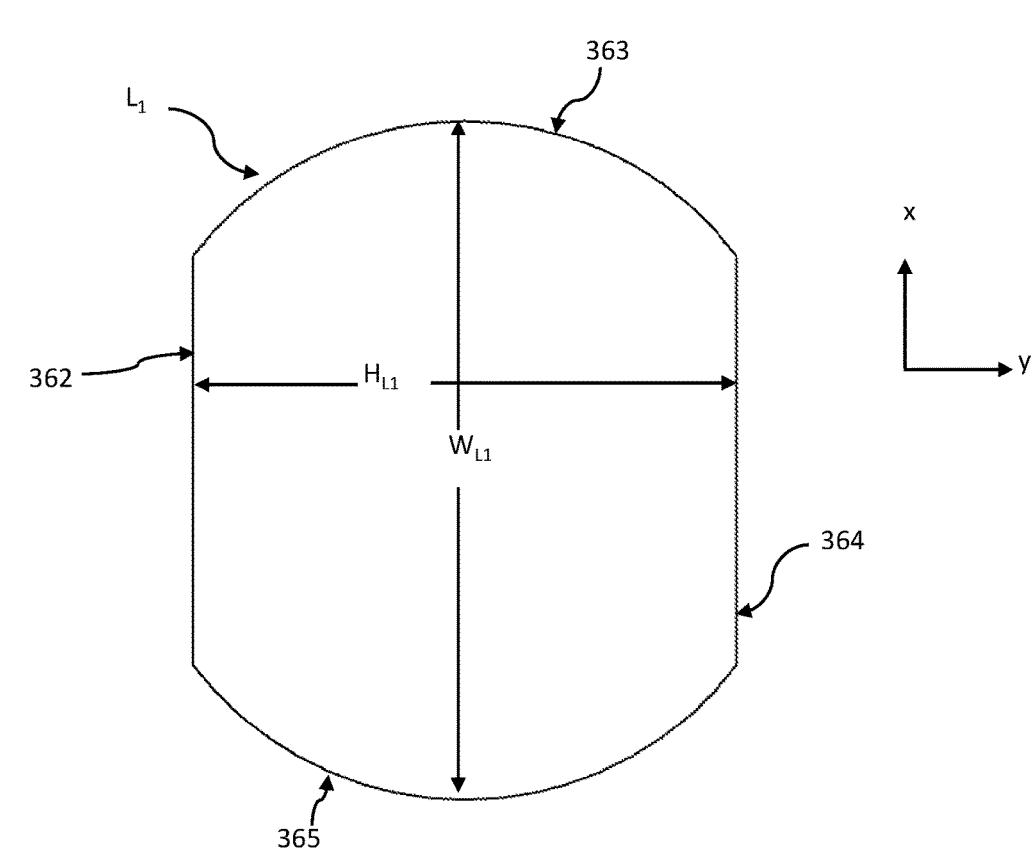
FIG. 3E shows the embodiment of an optical lens system from FIG. 3C in a top view.

A cut lens includes one or more lens elements $L_1$ which are cut, i.e. which have $W_{Li} > H_{Li}$ (see example FIG. 3E). Cutting a lens by X % may reduce a $MH_M$ and/or a $MH_S$ of a camera module such as 200 or 250 that includes any of the optical lens systems disclosed herein by about 0.5·X %-X %. For example, a D-cut ratio may be 0%-50%, meaning that $W_{Li}$ may be larger than $H_{Li}$ by κ%-50%, i.e. $W_{Li} = H_{Li} - 1.5 \cdot H_{Li}$. In some examples, a first lens group located at an object side of an O-OPFE such as 352-G1 and a second lens group located at an image side of an O-OPFE such as 352-G2 may be cut differently, i.e. the first lens group may have a D-cut ratio that is different than the D-cut ratio of the second lens group.

FIG. 3D shows 2G optical lens system 350 in a perspective view. The cut lens sides 362 and 364 of 352-G1 are visible as well as the un-cut sides 363 and 365. Also the cut lens sides 366 and 368 of 352-G2 are visible as well as the uncut sides 367 and 369 of 352-G2.

FIG. 3E shows element $L_1$ included in 352-G1 of 2G optical lens system 350 in a top view; $L_1$ is cut by 20%, i.e. its optical width $W_{Li}$ is 20% larger than its optical height $H_{L1}$. As $L_1$ defines the aperture of lens 352, this means that also the aperture diameter DA changed accordingly, so that the aperture is not axial symmetric. For cut lenses, DA is an effective aperture diameter as defined above.

Because of the D cut, a width of the aperture ("$W_L$") of lens 352 may be larger than a height "$H_L$", as shown in FIG. 3E. $H_{Li}$ is not measured along the z-axis, as e.g. for an optical height of lens elements included in 352-G2 or the lens elements of lens 104, see FIG. 1A, but along the y-axis. Therefore, $H_{L1}$ is not limited by $MH_M$, i.e. a lens such as lens 352 can support embodiments satisfying $H_L 1 > MH_S$, i.e. an aperture height (measured along the z-axis) which is larger than the module shoulder, opposite to known folded camera 100. This is beneficial in terms of the image quality of a camera that includes the optical systems disclosed herein, as it can overcome the geometrical limitation (i.e. $H_L < MH_S$) posed on lenses included in a module shoulder, as e.g. shown for the known folded camera 100 shown in FIG. 1A. The large aperture height allows for a larger effective DA, leading to a lower f/#, which is beneficial as it allows for more light entering the camera in a given time interval. The definitions and explanations given in FIG. 3E for optical lens system 350 are valid also for all other optical lens systems disclosed herein.

Figures 4, 5:
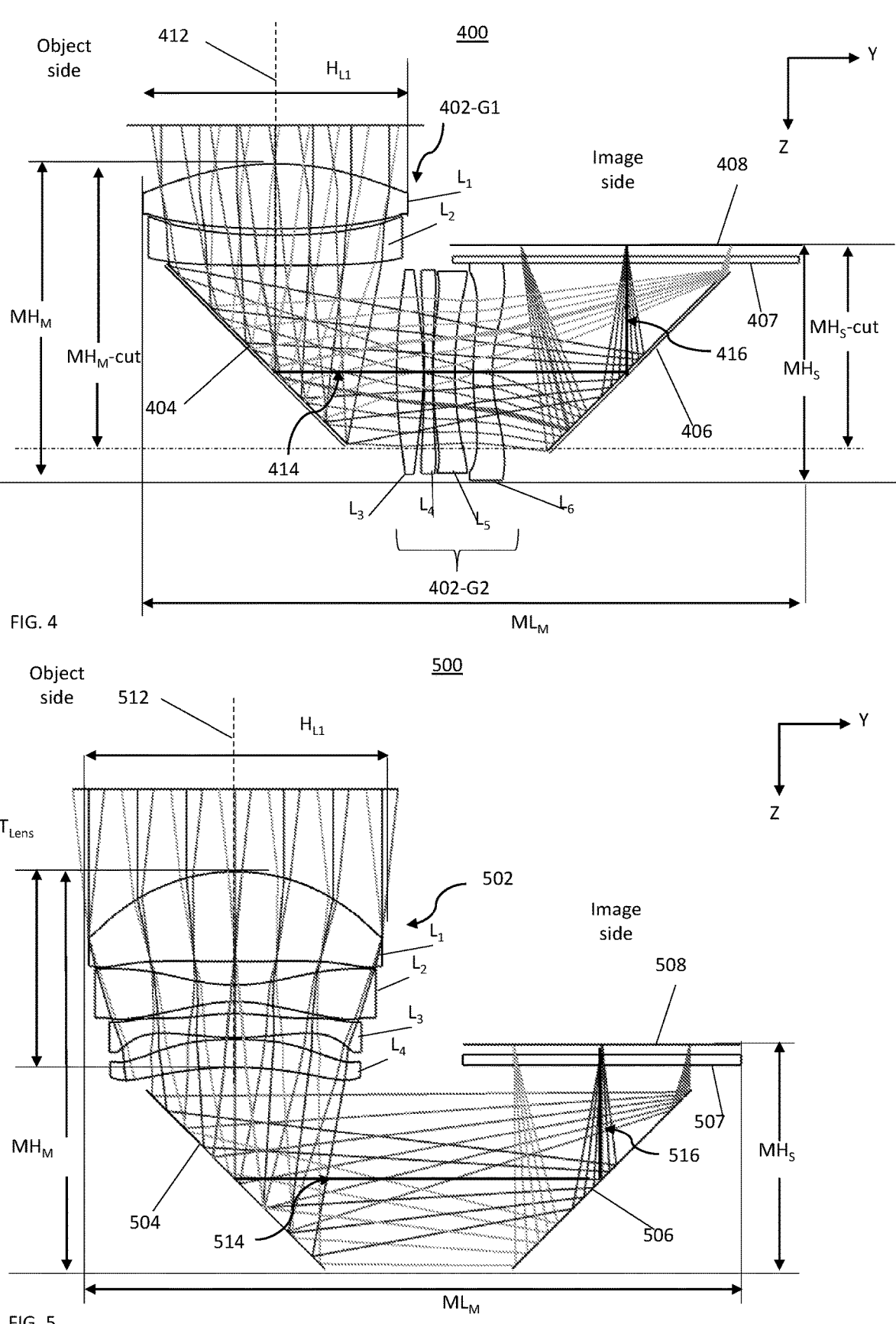
FIG. 4 shows another embodiment of an optical lens system disclosed herein in a cross-sectional view.
FIG. 5 shows yet another embodiment of an optical lens system disclosed herein in a cross-sectional view.

FIG. 4 shows another 2G optical lens system numbered 400. Lens system 400 comprises a lens 402, an O-OPFE 404 (e.g. a prism or a mirror), an I-OPFE 406 (e.g. a prism or a mirror), an optical element 407 and an image sensor 408. O-OPFE 404 and I-OPFE 406 are both oriented at an angle of 45 degrees with respect to the y-axis and the z-axis. Lens 402 is divided into G1 (including $L_1$ and $L_2$) and G2 (including $L_3$-$L_6$). In some examples, 402-G1 and/or 402-G2 may be cut lenses as see examples above. Detailed optical data and surface data for optical lens system 400 are given in Tables 5-6. O-OPFE 404 may be a mirror with dimensions 7.4 mm×7.82 mm (measured within the O-OPFE plane). I-OPFE 406 may be a mirror with dimensions 8.4 mm×7.86 mm (measured within the I-OPFE plane). Thicknesses relative to the OPFEs are with respect to the optical axis. In some examples, lens 402 may be cut as see FIG. 3B, so that O-OPFE 404 and I-OPFE 406 determine $MH_M$ and $MH_S$, as shown for $MH_M$-cut and $MH_S$-cut. For such an example, $MH_M$-cut=8.85 mm and $MH_S$-cut=6.35 mm (as shown).

TABLE 5

Example 400

EFL = 21.480 mm, F number = 2.686, HFOV = 13.9 deg.

| Surface # | Comment | Type | Curvature Radius | Thickness | Aperture Radius (DA/2) | Material | Index | Abbe # | Focal Length |
|---|---|---|---|---|---|---|---|---|---|
| 1 | A.S. | Plano | Infinity | −0.831 | 4.000 | | | | |
| 2 | Lens 1 | ASP | 8.375 | 1.997 | 4.065 | Glass | 1.48 | 84.1 | 13.023 |
| 3 | | | −23.832 | 0.194 | 3.922 | | | | |
| 4 | Lens 2 | ASP | −18.891 | 0.938 | 3.894 | Plastic | 1.61 | 25.6 | −32.522 |
| 5 | | | −315.856 | 3.274 | 3.898 | | | | |
| 6 | Mirror1 | Plano | Infinity | 3.727 | 4.009 | | | | |
| 7 | Lens 3 | ASP | 22.030 | 0.814 | 3.144 | Plastic | 1.66 | 20.4 | 11.548 |
| 8 | | | −11.657 | 0.037 | 3.139 | | | | |
| 9 | Lens 4 | ASP | −32.514 | 0.252 | 3.127 | Plastic | 1.61 | 25.6 | −29.590 |
| 10 | | | 42.000 | 0.037 | 3.107 | | | | |
| 11 | Lens 5 | ASP | 18.147 | 0.661 | 3.094 | Plastic | 1.54 | 55.9 | −166.146 |
| 12 | | | 14.928 | 0.558 | 3.086 | | | | |
| 13 | Lens 6 | ASP | 10.093 | 0.588 | 3.088 | Plastic | 1.67 | 19.2 | −12.276 |
| 14 | | | 4.451 | 4.103 | 3.334 | | | | |
| 15 | Mirror2 | Plano | Infinity | 3.343 | 5.711 | | | | |
| 16 | Filter | Plano | Infinity | 0.210 | — | Glass | 1.52 | 64.2 | |
| 17 | | | Infinity | 0.350 | — | | | | |
| 18 | Image | Plano | Infinity | — | — | | | | |

TABLE 6

| | Aspheric Coefficients | | |
|---|---|---|---|
| Surface # | Conic | 4th | 6th |
| 2 | 0 | −3.43E−04 | −8.99E−06 |
| 3 | 0 | −4.76E−04 | 4.50E−06 |
| 4 | 0 | −5.18E−04 | −1.46E−05 |
| 5 | 0 | −5.93E−04 | −3.23E−05 |
| 7 | 0 | −2.47E−03 | 3.07E−04 |
| 8 | 0 | −1.89E−03 | −2.23E−05 |
| 9 | 0 | 8.64E−04 | −2.71E−04 |
| 10 | 0 | −4.10E−03 | 4.83E−04 |
| 11 | 0 | −2.14E−03 | 1.80E−04 |
| 12 | 0 | −5.17E−03 | 6.36E−04 |
| 13 | 0 | 2.71E−03 | 7.77E−04 |
| 14 | 0 | 1.14E−02 | −1.95E−04 |

| | Aspheric Coefficients | | |
|---|---|---|---|
| Surface # | 8th | 10th | 12th |
| 2 | 1.12E−07 | −1.20E−08 | −3.86E−10 |
| 3 | −1.89E−07 | −5.15E−08 | 1.02E−09 |
| 4 | −5.29E−09 | −1.12E−08 | 4.72E−11 |
| 5 | 8.92E−07 | −1.35E−09 | −5.12E−10 |
| 7 | −1.14E−05 | −1.74E−07 | 4.98E−08 |
| 8 | 1.94E−05 | −2.32E−06 | 1.09E−07 |
| 9 | 3.11E−05 | −2.35E−06 | 3.96E−08 |
| 10 | 1.23E−05 | −1.54E−06 | 3.32E−09 |

TABLE 6-continued

| 11 | 3.86E−05 | −1.08E−06 | −6.50E−08 |
|---|---|---|---|
| 12 | −3.44E−05 | 3.26E−06 | −1.43E−07 |
| 13 | −7.33E−05 | 4.56E−06 | −1.06E−07 |
| 14 | 1.96E−06 | −7.63E−08 | 1.25E−08 |

FIG. 5 shows a "1-group" (or "1G") optical lens system numbered 500 comprising a lens 502 with N=4 lens elements, an O-OPFE 504, an I-OPFE 506, an optical element 507 and an image sensor 508. Lens 502 is not divided in two lens groups, but all 4 lens elements are located at an object side of O-OPFE 504.

Detailed optical data and surface data for optical lens system 500 are given in Tables 7-8. Both O-OPFE 504 and I-OPFE 506 may be mirrors. Dimensions of O-OPFE 504 and I-OPFE 506 are 5.0 mm×5.2 mm (measured within the OPFE planes). Thicknesses relative to the mirror are with respect to the optical axis. O-OPFE 504 and I-OPFE 506 are tilted by 45 degrees with respect to OP1 and OP2.

In some examples of 1G optical lens systems such as 500, 600 and 700, a lens may be a cut lens as see examples above. By cutting along the z-axis, a lower $MH_M$ and $MH_S$ may be achieved by reducing an O-OPFE's and a I-OPFE's size. By cutting a lens by X % will reduce $MH_M$ and $MH_S$ by about 0.5·X %-X %. For example, cutting a lens by 20% will reduce $MH_M$ and $MH_S$ by about 10%-20%.

TABLE 7

Example 500

EFL = 16.6 mm, F number = 2.77, HFOV = 6.16 deg.

| Surface # | Comment | Type | Curvature Radius | Thickness | Aperture Radius (DA/2) | Material | Index | Abbe # | Focal Length |
|---|---|---|---|---|---|---|---|---|---|
| 1 | A.S. | Plano | Infinity | −1.315 | 3.000 | | | | |
| 2 | Lens 1 | ASP | 3.903 | 1.848 | 3.000 | Plastic | 1.53 | 55.7 | 6.468 |
| 3 | | | −26.150 | 0.479 | 2.926 | | | | |
| 4 | Lens 2 | ASP | −3.510 | 0.336 | 2.866 | Plastic | 1.61 | 25.6 | −2.515 |
| 5 | | | 2.897 | 0.245 | 2.621 | | | | |
| 6 | Lens 3 | ASP | 4.232 | 0.492 | 2.578 | Plastic | 1.61 | 25.6 | 3.922 |
| 7 | | | −5.432 | 0.035 | 2.414 | | | | |
| 8 | Lens 4 | ASP | 7.617 | 0.571 | 2.465 | Plastic | 1.67 | 19.2 | −105.997 |
| 9 | | | 6.678 | 2.294 | 2.558 | | | | |
| 10 | Mirror1 | Plano | Infinity | 7.500 | 3.450 | | | | |
| 11 | Mirror2 | Plano | Infinity | 2.199 | 2.915 | | | | |
| 12 | Filter | Plano | Infinity | 0.210 | — | Glass | 1.52 | 64.2 | |
| 13 | | | Infinity | 0.350 | — | | | | |
| 14 | Image | Plano | Infinity | — | — | | | | |

TABLE 8

| | | Aspheric Coefficients | | |
|---|---|---|---|---|
| Surface # | Conic | 4th | 6th | 8th |
| 2 | 0 | 1.89E−04 | 3.33E−04 | −2.24E−04 |
| 3 | 0 | 1.24E−02 | −4.64E−03 | 1.37E−03 |
| 4 | 0 | 2.15E−02 | 5.17E−04 | −4.42E−04 |
| 5 | 0 | −5.86E−02 | 1.71E−02 | −4.76E−03 |
| 6 | 0 | −4.12E−02 | −1.78E−03 | 2.14E−03 |
| 7 | 0 | 3.35E−02 | −5.53E−03 | −8.70E−04 |
| 8 | 0 | 1.35E−02 | 7.93E−03 | −7.21E−03 |
| 9 | 0 | −1.28E−02 | 8.08E−03 | −2.88E−03 |

| | | Aspheric Coefficients | | |
|---|---|---|---|---|
| Surface # | 10th | 12th | 14th | 16th |
| 2 | 7.39E−05 | −1.30E−05 | 1.20E−06 | −4.67E−08 |
| 3 | −1.95E−04 | 1.15E−05 | −6.29E−08 | −1.69E−08 |
| 4 | 9.19E−05 | −1.48E−05 | 1.54E−06 | −6.58E−08 |
| 5 | 1.01E−03 | −1.53E−04 | 1.31E−05 | −4.75E−07 |

TABLE 8-continued

| | | | | |
|---|---|---|---|---|
| 6 | 2.08E−04 | −1.51E−04 | 1.79E−05 | −6.47E−07 |
| 7 | 9.54E−04 | −1.71E−04 | 8.57E−06 | 1.17E−07 |
| 8 | 2.36E−03 | −4.29E−04 | 4.28E−05 | −1.88E−06 |
| 9 | 5.05E−04 | −4.48E−05 | 1.31E−06 | 7.77E−09 |

Figure 6:
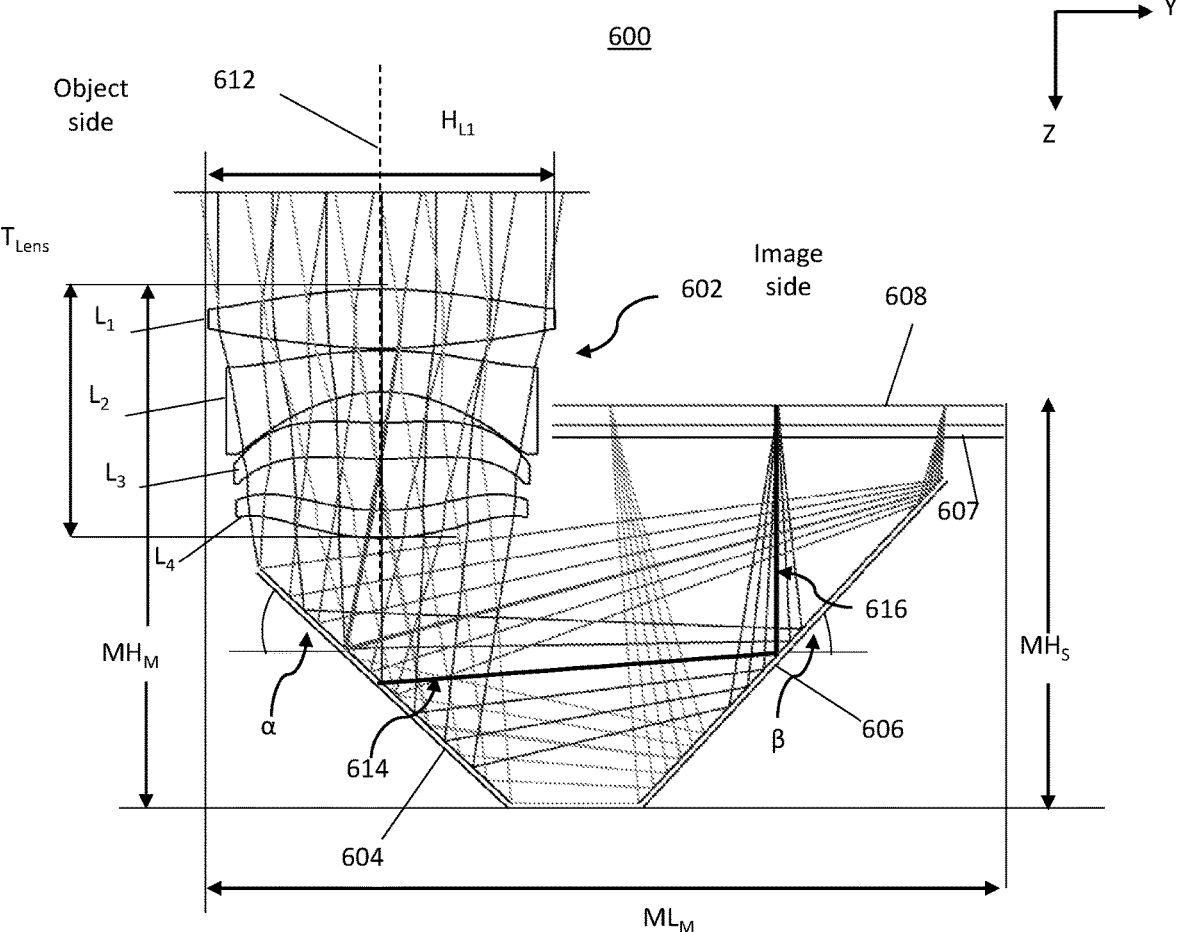
FIG. 6 shows yet another embodiment of an optical lens system disclosed herein in a cross-sectional view.

FIG. 6 shows another 1G optical lens system numbered 600 comprising a lens 602 with N=4 lens elements, an O-OPFE 604, an I-OPFE 606, an optical element 607 and an image sensor 608. All 4 lens elements of lens 602 are located at an object side of O-OPFE 604. Detailed optical data and surface data for optical lens system 600 are given in Tables 9-10. Both O-OPFE 6504 and I-OPFE 606 may be mirrors. Dimensions of O-OPFE 604 are 8.0 mm×6.1 mm (measured within the O-OPFE plane). Dimensions of I-OPFE 606 are 9.6 mm×7.9 mm (measured within the I-OPFE plane). Thicknesses relative to the OPFEs are with respect to the optical axis. O-OPFE 604 is tilted by α=43 degrees with respect to the y-axis. I-OPFE 606 is tilted by β=47 degrees with respect to the y-axis.

TABLE 9

Embodiment 600
EFL = 18.005 mm, F number = 3.104, HFOV = 17.5 deg.

| Surface # | Comment | Type | Curvature Radius | Thickness | Aperture Radius (DA/2) | Material | Index | Abbe # | Focal Length |
|---|---|---|---|---|---|---|---|---|---|
| 1 | A.S. | Plano | Infinity | −0.281 | 2.900 | | | | |
| 2 | Lens 1 | QT1 | 9.028 | 1.045 | 3.029 | Glass | 1.74 | 44.5 | 5.944 |
| 3 | | | −8.194 | 0.036 | 2.947 | | | | |
| 4 | Lens 2 | QT1 | 8.120 | 0.731 | 2.718 | Plastic | 1.61 | 25.6 | −7.570 |
| 5 | | | 2.868 | 0.545 | 2.532 | | | | |
| 6 | Lens 3 | QT1 | −7.133 | 0.639 | 2.585 | Plastic | 1.53 | 55.7 | 5595.229 |
| 7 | | | −7.339 | 0.908 | 2.499 | | | | |
| 8 | Lens 4 | QT1 | −3.759 | 0.491 | 2.544 | Plastic | 1.67 | 19.2 | 3369.081 |
| 9 | | | −3.951 | 2.702 | 2.532 | | | | |
| 10 | Mirror1 | Plano | Infinity | 6.631 | 3.863 | | | | |
| 11 | Mirror2 | Plano | Infinity | 4.171 | 6.040 | | | | |
| 12 | Filter | Plano | Infinity | 0.210 | — | Glass | 1.52 | 64.2 | |
| 13 | | | Infinity | 0.350 | — | | | | |
| 14 | Image | Plano | Infinity | — | — | | | | |

TABLE 10

| | | Aspheric Coefficients | | | |
|---|---|---|---|---|---|
| Surface # | Norm Radius | A0 | A1 | A2 | A3 |
| 2 | 3.023 | −1.75E−01 | 1.60E−03 | −3.30E−03 | 1.42E−03 |
| 3 | 2.956 | 2.61E−01 | −4.54E−02 | 6.55E−03 | −2.54E−04 |
| 4 | 2.860 | −2.00E−01 | −3.11E−02 | 1.01E−02 | −3.86E−03 |
| 5 | 2.803 | −7.32E−01 | −1.81E−01 | −6.31E−02 | −3.28E−02 |
| 6 | 2.910 | 1.88E+00 | −1.28E−01 | 1.51E−02 | −3.73E−02 |
| 7 | 2.779 | 1.29E+00 | −4.92E−02 | 1.64E−02 | −2.79E−02 |
| 8 | 2.811 | 1.17E+00 | 8.03E−03 | −2.09E−02 | −1.38E−02 |
| 9 | 2.820 | 8.39E−01 | 5.59E−02 | −3.25E−03 | −7.79E−03 |

| | Aspheric Coefficients | | | |
|---|---|---|---|---|
| Surface # | A4 | A5 | A6 | A7 |
| 2 | −7.48E−04 | 1.68E−04 | 4.26E−05 | 3.64E−05 |
| 3 | −9.33E−04 | 4.97E−04 | −2.64E−05 | 2.54E−05 |
| 4 | 6.51E−04 | 3.66E−04 | 2.41E−04 | −1.85E−04 |
| 5 | −1.10E−04 | −1.34E−03 | −7.55E−04 | −6.47E−04 |
| 6 | −1.16E−02 | −1.61E−02 | −5.93E−03 | −1.22E−03 |
| 7 | −2.02E−02 | −1.89E−02 | −7.11E−03 | −1.17E−03 |
| 8 | −9.40E−04 | −1.80E−03 | −3.20E−04 | 2.19E−05 |
| 9 | −7.62E−04 | −3.16E−04 | 1.17E−04 | 1.12E−04 |

Figure 7A:
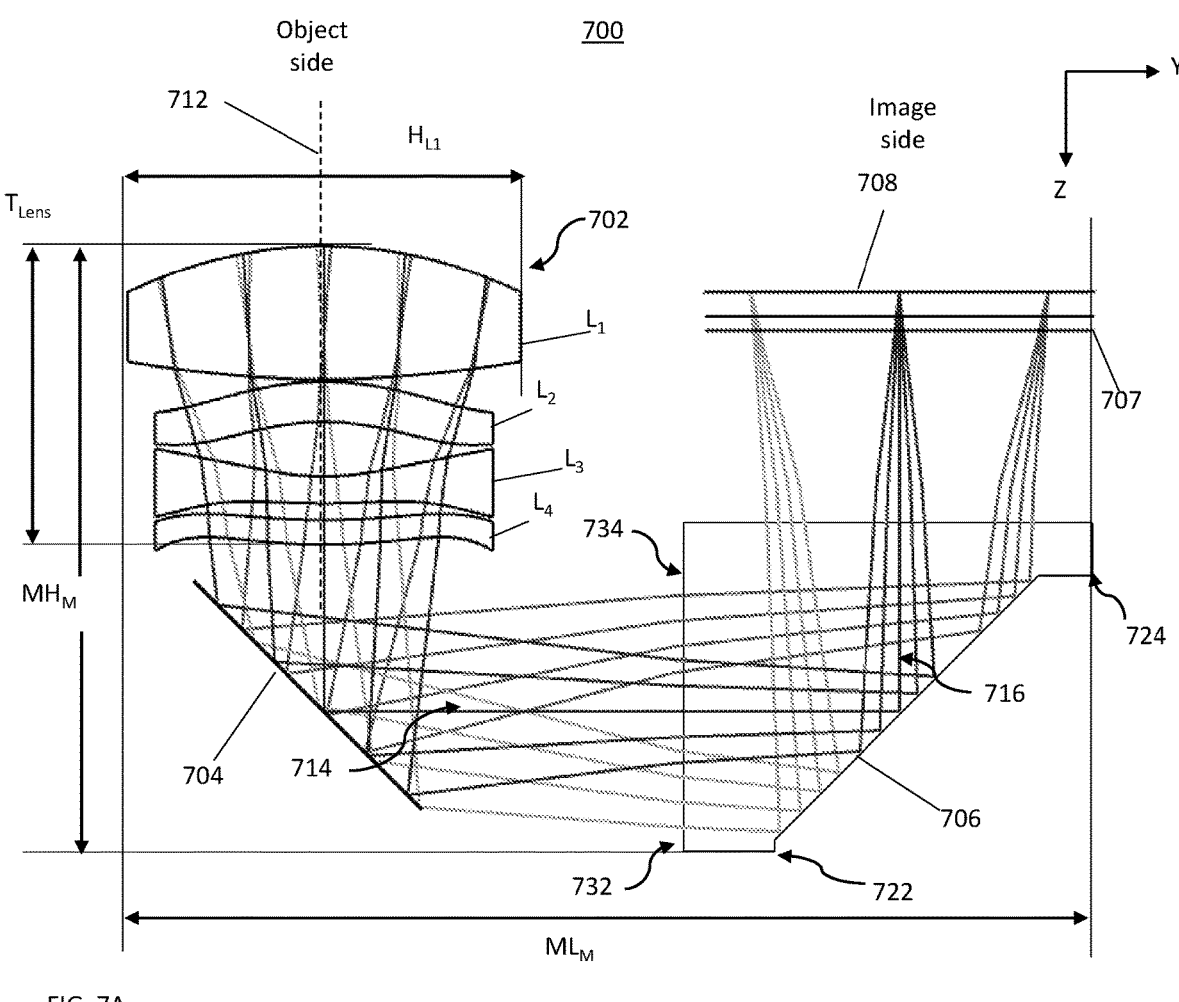
FIG. 7A shows yet another embodiment of an optical lens system disclosed herein in a cross-sectional view.

FIG. 7A shows yet another 1G optical lens system numbered 700 comprising a lens 702 with N=4 lens elements, an O-OPFE 704, an I-OPFE 706, an optical element 707 and an image sensor 708. All 4 lens elements are located at an object side of O-OPFE 704.

Detailed optical data and surface data for optical lens system 700 are given in Tables 11-12. O-OPFE 704 may be a mirror and I-OPFE 706 may be a prism. Dimensions of O-OPFE 704 are 6.2 mm×4.64 mm (measured within the O-OPFE plane). Dimensions of I-OPFE 706 are 6.7 mm×9.16 mm (measured within the I-OPFE plane). O-OPFE 704 and I-OPFE 706 are tilted by 45 degrees with respect to the y-axis. O-OPFE 704 is a mirror, I-OPFE 706 is a prism.

Prism 706 includes an object-sided bottom stray light prevention mechanism 732, an object-sided top stray light prevention mechanism 734, an image-sided bottom stray light prevention mechanism 722 and an image-sided top stray light prevention mechanism 724.

TABLE 11

Example 700
EFL = 19.613 mm, F number = 2.96, HFOV = 10.25 deg.

| Surface # | Comment | Type | Curvature Radius | Thickness | Aperture Radius (DA/2) | Material | Index | Abbe # | Focal Length |
|---|---|---|---|---|---|---|---|---|---|
| 1 | A.S. | Plano | Infinity | −0.963 | 3.500 | | | | |
| 2 | Lens 1 | ASP | 6.248 | 1.928 | 3.514 | Plastic | 1.53 | 55.7 | 7.626 |
| 3 | | ASP | −10.579 | 0.030 | 3.446 | | | | |
| 4 | Lens 2 | ASP | 4.345 | 0.576 | 3.354 | Plastic | 1.67 | 19.2 | −44.264 |
| 5 | | ASP | 3.592 | 0.787 | 3.317 | | | | |
| 6 | Lens 3 | ASP | −3.388 | 0.386 | 3.288 | Plastic | 1.61 | 25.6 | −8.264 |
| 7 | | ASP | −10.482 | 0.237 | 2.800 | | | | |
| 8 | Lens 4 | ASP | −11.961 | 0.357 | 2.845 | Plastic | 1.67 | 19.2 | 37.502 |
| 9 | | ASP | −8.228 | 2.405 | 2.751 | | | | |
| 10 | Mirror1 | Plano | Infinity | 5.042 | 3.729 | | | | |
| 11 | Prism | | | 3.24 | 3.049 | Glass | 1.85 | 23.8 | |
| 12 | Mirror2 | | | 3.24 | 3.823 | | | | |
| 13 | Prism | | | 2.242 | 3.289 | Glass | 1.85 | 23.8 | |
| 14 | Filter | Plano | Infinity | 0.210 | — | Glass | 1.52 | 64.2 | |
| 15 | | | Infinity | 0.350 | — | | | | |
| 16 | Image | Plano | Infinity | — | — | | | | |

TABLE 12

| Surface # | Aspheric Coefficients | | | |
|---|---|---|---|---|
| | Conic | 4th | 6th | 8th |
| 2 | 0 | 2.04E−04 | −3.49E−05 | 1.60E−05 |
| 3 | 0 | 7.81E−03 | −1.99E−03 | 3.60E−04 |
| 4 | 0 | −3.49E−03 | −3.47E−04 | −3.06E−04 |
| 5 | 0 | −1.45E−02 | 1.15E−03 | −1.36E−03 |
| 6 | 0 | 3.34E−02 | −3.79E−03 | 2.59E−05 |
| 7 | 0 | 1.56E−02 | 5.21E−03 | −1.77E−03 |
| 8 | 0 | −1.25E−02 | 1.13E−02 | −3.06E−03 |
| 9 | 0 | 5.21E−04 | 4.34E−03 | −1.02E−03 |

| Surface # | Aspheric Coefficients | | | |
|---|---|---|---|---|
| | 10th | 12th | 14th | 16th |
| 2 | −4.59E−06 | 5.23E−07 | −3.49E−08 | 1.12E−09 |
| 3 | −4.94E−05 | 4.61E−06 | −2.48E−07 | 5.86E−09 |
| 4 | 3.99E−05 | 5.77E−07 | −2.09E−07 | 5.10E−09 |
| 5 | 3.50E−04 | −4.19E−05 | 2.68E−06 | −7.47E−08 |
| 6 | 5.54E−05 | −5.71E−06 | 2.24E−07 | −5.81E−11 |
| 7 | 1.64E−04 | −6.92E−06 | 1.02E−06 | −8.54E−08 |
| 8 | 5.56E−04 | −7.22E−05 | 6.19E−06 | −2.54E−07 |
| 9 | 1.79E−04 | −4.43E−06 | −2.13E−06 | 1.50E−07 |

Figure 7B:
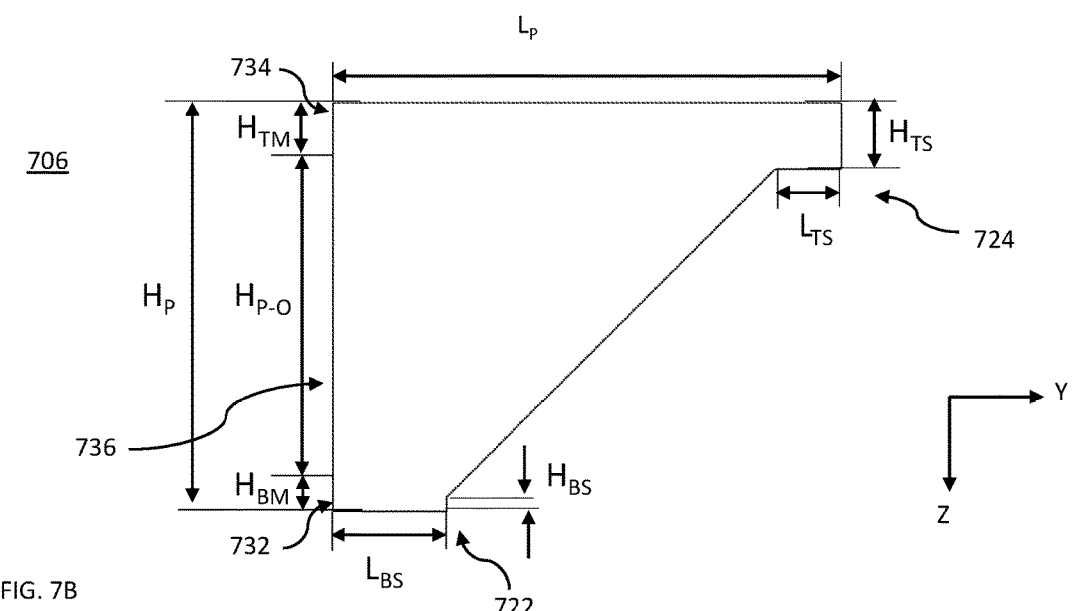
FIG. 7B shows a prism of the optical lens system of FIG. 7A in a side view.
Figure 7C:
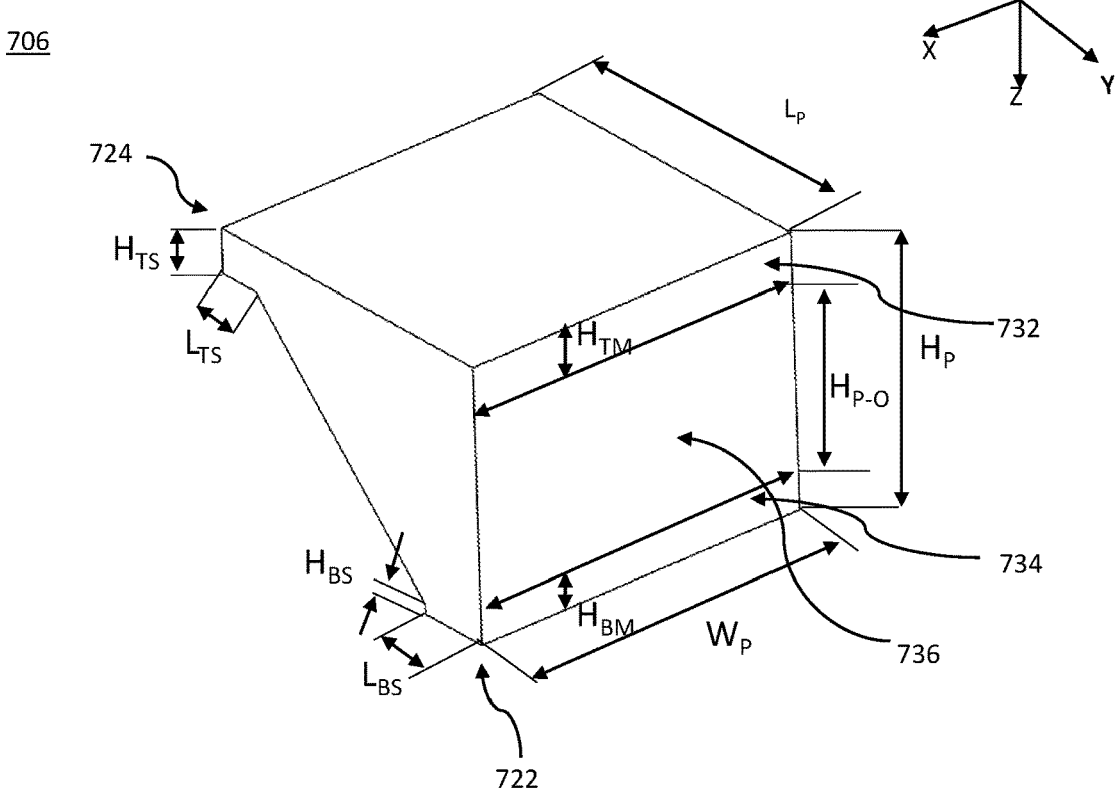
FIG. 7C shows a prism of the optical lens system of FIG. 7A in a perspective view.

FIG. 7B shows prism 706 in a side view. FIG. 7C shows prism 706 in a perspective view. Object-sided bottom stray light prevention mechanism 732 and object-sided top stray light prevention mechanism 734 are stray light prevention masks. This means that no light is entering prism 706 where stray mask 732 and stray mask 734 are located, but light enters only in optically active are 736. Image-sided bottom stray light prevention mechanism 722 and image-sided top stray light prevention mechanism 724 are geometrical stray light prevention mechanisms that are referred to in the following as "stray light prevention shelves".

Prism 706 has a prism height ("$H_P$") and an optical (or optically active) prism height ("$H_{P-O}$") measured along the z-axis, a prism length ("$L_P$") measured along the y-axis and a prism width ("$W_P$") measured along the x-axis. Bottom stray light prevention shelve 722 and top stray light prevention shelve 724 have a length ("$L_{BS}$" and "$L_{TS}$" for a length of the "bottom shelve" and "top shelve" respectively) and a height ("$H_{BS}$" and "$H_{TS}$" respectively). Bottom stray light prevention mask 732 and top stray light prevention mask 734 have a height ("$H_{BM}$" and "$H_{TM}$" for a height of the "bottom mask" and "top mask" respectively. Values and ranges are given in Table 13 in mm.

The stray light prevention mechanisms are beneficial because they prevent stray light from reaching an image sensor such as image sensor 708. Stray light is undesired light emitted or reflected from an object in a scene which enters a camera's aperture and reaches an image sensor at a light path that is different from a planned (or desired) light path. A planned light path is described as follows:

1. Light is emitted or reflected by an object in a scene.
2. Light enters the camera's aperture and passes once all surfaces of a lens (for 1G optical lens systems) or a G1 of a lens (for 2G optical lens systems).
3. For examples where O-OPFE is a mirror, light is reflected once. For examples where O-OPFE is a prism, light passes once an object-sided surface of an O-OPFE, is reflected once as shown for the optical lens systems disclosed herein, and then passes once an image-sided surface of an O-OPFE.
4. For 2G optical lens systems, light passes once all surfaces of a G2 of a lens.
5. For examples where I-OPFE is a mirror, light is reflected once. For examples where I-OPFE is a prism, light passes once an object-sided surface of an I-OPFE, is reflected once as shown for the optical lens systems disclosed herein, and then passes once an image-sided surface of an I-OPFE.
6. Light impinges on an image sensor.

Light that reaches an image sensor on any light path other than the planned light path described above is considered undesired and referred to as stray light.

TABLE 13

|  | Value | Value range |
|---|---|---|
| $H_P$ | 5.2 | 3-10 |
| $H_{P-O}$ | 3.5 | 2-10 |
| $L_P$ | 6.5 | 4-12.5 |
| $W_P$ | 7.1 | 4-12.5 |
| $H_{BS}$ | 0.18 | 0.05-1 |
| $L_{BS}$ | 1.45 | 0.25-5 |
| $H_{TS}$ | 0.85 | 0.2-4 |
| $L_{TS}$ | 0.85 | 0.2-4 |
| $H_{BM}$ | 0.4 | 0.2-3 |
| $H_{TM}$ | 1.3 | 0.5-4 |

Figure 8A:
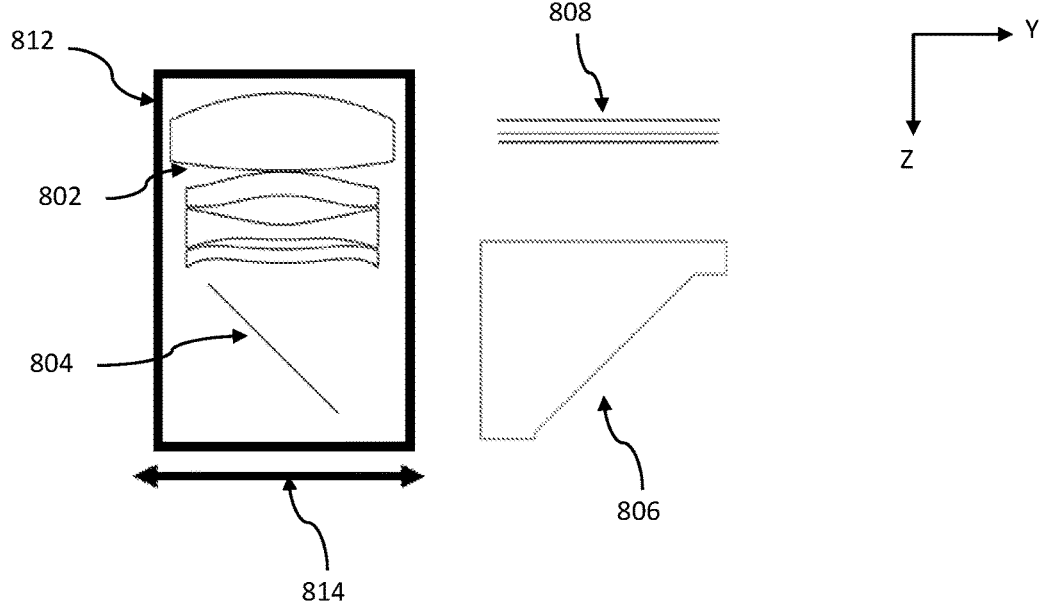
FIG. 8A shows schematically a method for focusing (or "autofocusing" or "AF") in an optical lens systems disclosed herein.

FIG. 8A shows schematically a method for focusing (or "autofocusing" or "AF") in an optical lens systems disclosed herein.

Focusing of 1G Optical System

Lens 802 and O-OPFE 804 are moved together linearly along the y-axis relative to I-OPFE 806 and image sensor 808, which do not move. Box 812 indicates the components moving for performing AF, arrow 814 indicates the direction of movement for performing AF. An actuator as known in the art, e.g. a voice coil motor (VCM) or a stepper motor, may be used for actuating this movement as well as all other movements described in FIGS. 8A-C.

In addition, a 1G optical lens system can perform focusing and OIS like a regular (or "vertical" or "non-folded") camera such as Wide camera 130. Specifically, a 1G optical lens system can be focused by moving only a lens such as lens 802 along an axis parallel to the z-axis with respect to all other camera components, i.e. lens 802 is moved along the z-axis with respect to O-OPFE 804, I-OPFE 806 and image sensor 808. For performing OIS along a first OIS axis, only lens 802 can be moved along an axis parallel to the y-axis with respect to all other camera components. For performing OIS along a second OIS axis, lens 802 can be moved along an axis perpendicular to both the y-axis and the z-axis with respect to all other camera components.

Focusing of 2G Optical System

A first lens group such as e.g. lens group 302-G1, an O-OPFE such as O-OPFE 304 and a second lens group such as lens group 302-G2 are moved together along the y-direction. An I-OPFE such as I-OPFE 306 and an image sensor such as image sensor 308 do not move.

Figure 8B:
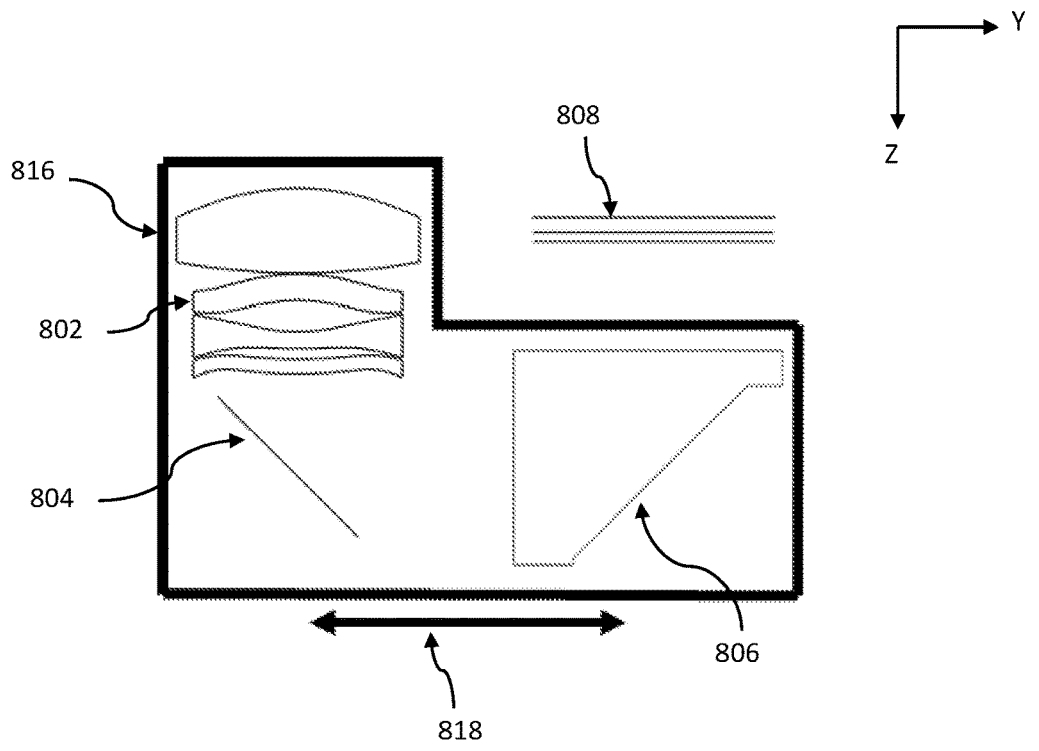
FIG. 8B shows schematically a method for performing optical image stabilization (OIS) in a first OIS direction for optical lens systems disclosed herein.

FIG. 8B shows schematically a method for performing optical image stabilization (OIS) in a first OIS direction for optical lens systems disclosed herein.

OIS in a First Direction in 1G Optical Lens Systems

Lens 802, O-OPFE 804 and I-OPFE 806 are moved together linearly along the y-axis relative to image sensor 808, which does not move. Box 816 indicates the components moving for performing OIS in a first OIS direction, arrow 818 indicates the direction of movement for performing OIS in a first OIS direction.

OIS in a First Direction in 2G Optical Lens Systems

A first lens group such as 302-G1, an O-OPFE such as O-OPFE 304, a second lens group such as 302-G2 and an I-OPFE such as I-OPFE 306 are moved together along the y-direction. An image sensor such as image sensor 308 does not move. In other 2G optical lens systems, only a first lens group such as 302-G1, an O-OPFE such as O-OPFE 304 and a second lens group such as 302-G2 are moved relative to an I-OPFE such as I-OPFE 306 and relative to an image sensor such as image sensor 308.

Figure 8C:
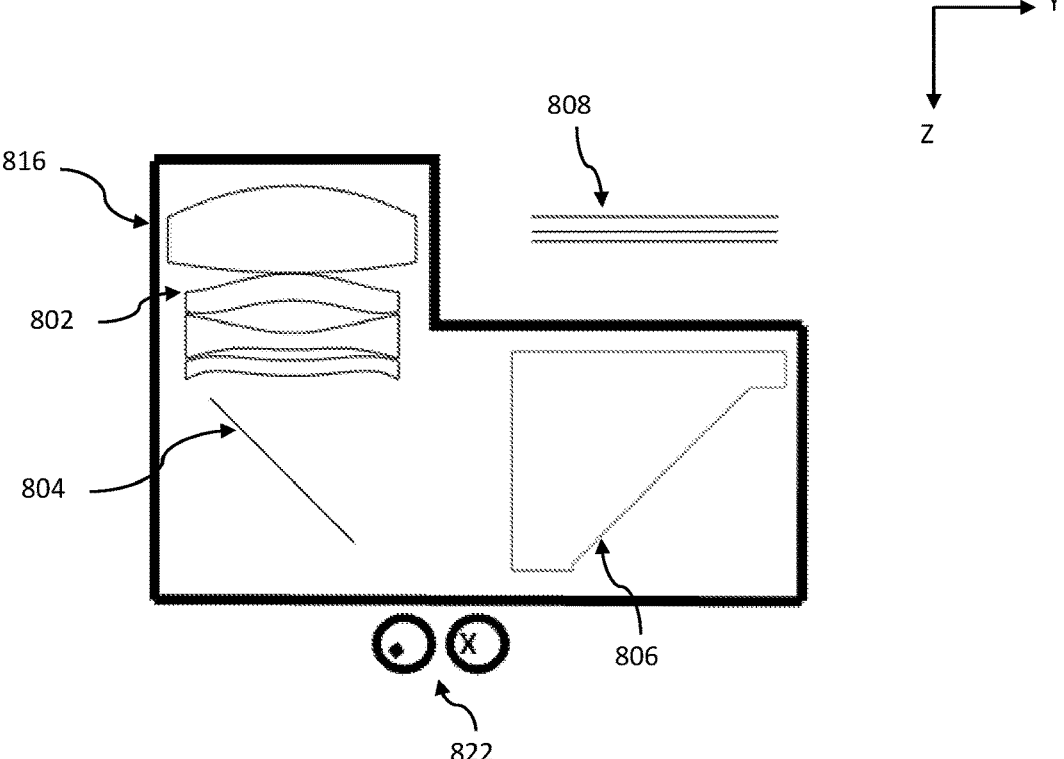
FIG. 8C shows schematically a method disclosed herein for performing OIS in a second OIS direction for optical lens systems disclosed herein.

FIG. 8C shows schematically a method disclosed herein for performing OIS in a second OIS direction for optical lens systems disclosed herein.

OIS in a Second Direction in 1G Optical Lens Systems

Lens 802, O-OPFE 804 and I-OPFE 806 are moved together linearly perpendicular to the y-z coordinate system shown relative to image sensor 808, which does not move. Box 816 indicates the components moving for performing OIS in a second OIS direction, arrows 822 indicate the direction of movement for performing OIS in a second OIS direction. Arrows 822 point in directions which are perpendicular to the y-z coordinate system shown.

OIS in a Second Direction in 2G Optical Lens Systems

A first lens group such as 302-G1, an O-OPFE such as O-OPFE 304, a second lens group such as 302-G2 and an I-OPFE such as I-OPFE 306 are moved linearly perpendicular to the y-z coordinate system shown relative to an image sensor such as image sensor 308, which does not move. In other 2G optical lens systems, only a first lens group such as 302-G1, an O-OPFE such as O-OPFE 304 and a second lens group such as 302-G2 are moved relative to an I-OPFE such as I-OPFE 306 and relative to an image sensor such as image sensor 308.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

Furthermore, for the sake of clarity the term "substantially" is used herein to imply the possibility of variations in values within an acceptable range. According to one example, the term "substantially" used herein should be interpreted to imply possible variation of up to 5% over or under any specified value. According to another example, the term "substantially" used herein should be interpreted to imply possible variation of up to 2.5% over or under any specified value. According to a further example, the term "substantially" used herein should be interpreted to imply possible variation of up to 1% over or under any specified value.

All patents and patent applications mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present disclosure.

What is claimed is:

1. A camera module, comprising:

a lens with N=6 lens elements $L_i$ divided into a first lens group (G1) having at least two lens elements, and a second lens group (G2) and having an effective focal length EFL, an aperture diameter DA, a f-number f/#, a total track length TTL and a back focal length BFL, wherein each lens element has a respective focal length $f_i$ and wherein a first lens element $L_1$ faces an object side and a last lens element $L_N$ faces an image side;

an object side-optical path folding element O-OPFE for folding a first optical path (OP1) to a second optical path (OP2);

an image side-optical path folding element I-OPFE for folding OP2 to a third optical path (OP3), wherein OP1 and OP2 are perpendicular to each other and wherein OP1 and OP3 are parallel with each other; and an image sensor having a sensor diagonal (SD), wherein the camera module is a folded digital camera module, wherein G1 is located at an object side of the O-OPFE and G2 is located at an image side of the O-OPFE, wherein the EFL is in the range of 8 mm<EFL<50 mm, wherein the camera module is divided into a first region having a minimum camera module region height $MH_M$ and including G1 and the O-OPFE, and into a second region having a minimum shoulder region height $MH_S < MH_M$ and including the I-OPFE and the image sensor, wherein all heights are measured along OP1, wherein an aperture height of the lens is $H_L$ and wherein $H_L/MH_S > 0.9$, wherein the camera module has a minimum camera module length $ML_M$, wherein EFL>1.1·$ML_M$, and wherein at least one lens element in G2 is cut on at least one side to reduce $MH_S$ and $MH_M$, where the camera module has an overall height ($H_M$) equal to $MH_M$ plus a penalty, the penalty accounting for movement space required for optical components within the module and satisfying 0.5 mm<penalty<3 mm.

2. A camera module of claim 1, wherein a ratio between an average lens thickness (ALT) of all lens elements $L_1$-$L_N$ and TTL fulfills ALT/TTL<0.05.

3. A camera module of claim 1, wherein an aperture height of the lens is $H_L$ and wherein $H_L/MH_S > 0.9$, wherein a ratio of the thickness of $L_1$ (T1) and an average lens thickness (ALT) of all lens elements $L_1$-$L_N$ fulfills T1/ALT>2.

4. A camera module of claim 1, wherein a distance d5-6 between $L_5$ and Lo and an average lens thickness (ALT) of all lens elements $L_1$-$L_N$ fulfills d5-6/ALT>1.2.

5. The camera module of claim 1, wherein a ratio between the f-number f1 of $L_1$ and EFL fulfills f1/EFL<0.75.

6. A mobile device including the camera module of claim 1, wherein the mobile device has a device thickness T and a camera bump region, wherein the bump region has an elevated height T+B, wherein the first region of the camera module is incorporated into the camera bump region and wherein the second region of the camera module is not incorporated into the camera bump region.

7. The mobile device of claim 6, wherein the first region of the camera includes the camera module lens, and wherein the second region of the camera includes the camera module image sensor.

8. The camera module of claim 1, wherein 5 mm<SD<15 mm.

9. The camera module of claim 2, wherein the camera module has a minimum camera module length $ML_M$ and wherein EFL>1.1·$ML_M$.

10. The camera module of claim 2, wherein 5 mm<SD<15 mm.

11. A mobile device including the camera module of claim 2, wherein the mobile device has a device thickness T and a camera bump region, wherein the bump region has an elevated height T+B, wherein a first region of the camera module is incorporated into the camera bump region and wherein a second region of the camera module is not incorporated into the camera bump region.

12. The mobile device of claim 11, wherein the first region of the camera includes the camera module lens, and wherein the second region of the camera includes the camera module image sensor.

13. The camera module of claim 3, wherein the camera module has a minimum camera module length $ML_M$ and wherein EFL>1.1·$ML_M$.

14. The camera module of claim 3, wherein 5 mm<SD<15 mm.

15. A mobile device including the camera module of claim 3, wherein the mobile device has a device thickness T and a camera bump region, wherein the bump region has an elevated height T+B, wherein a first region of the camera module is incorporated into the camera bump region and wherein a second region of the camera module is not incorporated into the camera bump region.

16. The mobile device of claim 15, wherein the first region of the camera includes the camera module lens, and wherein the second region of the camera includes the camera module image sensor.

17. The camera module of claim 4, wherein the camera module has a minimum camera module length $ML_M$ and wherein EFL>1.1·$ML_M$.

18. The camera module of claim 4, wherein 5 mm<SD<15 mm.

19. A mobile device including the camera module of claim 4, wherein the mobile device has a device thickness T and a camera bump region, wherein the bump region has an elevated height T+B, wherein a first region of the camera module is incorporated into the camera bump region and wherein a second region of the camera module is not incorporated into the camera bump region.

20. The mobile device of claim 19, wherein the first region of the camera includes the camera module lens, and wherein the second region of the camera includes the camera module image sensor.

* * * * *